(12) United States Patent
Ito et al.

(10) Patent No.: US 11,769,433 B2
(45) Date of Patent: Sep. 26, 2023

(54) INFORMATION PROCESSING DEVICE AND CONTROL METHOD

(71) Applicant: Lenovo (Singapore) Pte. Ltd., Singapore (SG)

(72) Inventors: Yoshinori Ito, Kanagawa (JP); Kyoko Kawamura, Kanagawa (JP); Noritoshi Yoshiyama, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/879,388

(22) Filed: Aug. 2, 2022

(65) Prior Publication Data

US 2023/0076731 A1     Mar. 9, 2023

(30) Foreign Application Priority Data

Sep. 9, 2021 (JP) ................. 2021-146752

(51) Int. Cl.
*G09G 3/00* (2006.01)
*G06F 1/16* (2006.01)
*G06F 9/4401* (2018.01)
*G06F 3/023* (2006.01)

(52) U.S. Cl.
CPC .......... *G09G 3/035* (2020.08); *G06F 1/1652* (2013.01); *G06F 9/4406* (2013.01); *G06F 3/0231* (2013.01); *G09G 2320/08* (2013.01); *G09G 2340/0492* (2013.01); *G09G 2354/00* (2013.01)

(58) Field of Classification Search
CPC ...... G06F 1/1616; G06F 1/1618; G06F 1/162; G09G 3/035; G09G 2380/02
See application file for complete search history.

(56) References Cited

U.S. PATENT DOCUMENTS

| | | | |
|---|---|---|---|
| 10,866,694 B2 * | 12/2020 | Kim | G06F 3/1446 |
| 2016/0321969 A1 * | 11/2016 | Kambhatla | G09G 3/035 |
| 2018/0039408 A1 | 2/2018 | Cheong et al. | |
| 2021/0097901 A1 * | 4/2021 | Klein | G06F 3/0481 |
| 2021/0150953 A1 * | 5/2021 | Lee | G09G 3/035 |
| 2021/0247805 A1 | 8/2021 | Min et al. | |

FOREIGN PATENT DOCUMENTS

| | | |
|---|---|---|
| JP | 2018-013850 A | 1/2018 |
| JP | 2020-190940 A | 11/2020 |
| WO | 2020/218742 A1 | 10/2020 |

* cited by examiner

*Primary Examiner* — Kevin M Nguyen
(74) *Attorney, Agent, or Firm* — Osha Bergman Watanabe & Burton LLP

(57) ABSTRACT

An information processing device includes: a foldable one display; a memory which stores at least a program; and a processor which executes the program stored in the memory. By executing the program stored in the memory, the processor performs: operating state switching processing to switch an operating state of a system among a first operating state, a second operating state in which processing of the system is more limited than that in the first operating state and at least the display is hidden, and a third operating state in which the processing of the system is shut down, display mode switching processing to switch between a first display mode to control display by setting a screen area of the display as one display area, and a second display mode to control display by splitting the screen area into plural display areas, and setting switching processing.

9 Claims, 12 Drawing Sheets

INFORMATION PROCESSING DEVICE AND CONTROL METHOD

CROSS-REFERENCE TO RELATED APPLICATIONS

This application claims priority to Japanese Patent Application No. 2021-146752 filed on Sep. 9, 2021, the contents of which are hereby incorporated herein by reference in their entirety.

TECHNICAL FIELD

The present invention relates to an information processing device and a control method.

BACKGROUND

In recent years, an information processing device in which a foldable flexible display (display unit) is provided over a first chassis and a second chassis to be bendable according to the rotation of the first chassis and the second chassis has been disclosed (for example, see Japanese Unexamined Patent Application Publication No. 2018-13850). When one display is provided over the first chassis and the second chassis in this way, the one display can not only be used as a one-screen mode but also as a pseudo two-screen mode by splitting the one display into a display area on the first chassis side and a display area on the second chassis side.

When applications run on an information processing device to do work, there are cases where a user wants to display the window of an application on one screen and where the user wants to display two or more applications on two screens. However, there are a case where the user temporarily interrupts the work in the middle of working in the one-screen mode or the two-screen mode and then resumes the work, and a case where the user finishes the work and then starts new work. For example, after putting the information processing device to sleep or shut down by interrupting or finishing the work, when starting the information processing device to resume work, the information processing device may not switch to a screen mode desired by the user.

SUMMARY

One or more embodiments of the present invention provide an information processing device and a control method to control display on a foldable display properly.

One or more embodiments of the present invention is an information processing device that includes: a foldable one display; a memory which stores at least a program; and a processor which executes the program stored in the memory, wherein, by executing the program stored in the memory, the processor performs operating state switching processing to switch the operating state of a system among a first operating state, a second operating state in which processing of the system is more limited than that in the first operating state and at least the display is hidden, and a third operating state in which the processing of the system is shut down, display mode switching processing to switch between a first display mode to control display by setting a screen area of the display as one display area, and a second display mode to control display by splitting the screen area into plural display areas, and setting switching processing to switch among a first setting to provide a control to allow a user to select either one of the first display mode and the second display mode according to a change in state as to whether or not the display is in a bent state, a second setting to perform the display mode switching processing according to the change in the state as to whether or not the display is in the bent state, and a third setting in which the display mode switching processing is not performed even when there is the change in the state as to whether or not the display is in the bent state, and when returning from the second operating state to the first operating state after transition from the first operating state to the second operating state, the processor controls a display mode to the display mode before transition to the second operating state between the first display mode and the second display mode by the display mode switching processing, and controls a setting to the setting before transition to the second operating state among the first setting, the second setting, and the third setting by the setting switching processing.

The above information processing device may also be such that, when returning from the third operating state to the first operating state after transition from the first operating state or the second operating state to the third operating state, the processor controls the display mode to a preset display mode between the first display mode and the second display mode by the display mode switching processing, and controls the setting to a setting before transition to the third operating state among the first setting, the second setting, and the third setting by the setting switching processing.

The above information processing device may further include a first sensor which detects the orientation of the information processing device, wherein, by executing the program stored in the memory, the processor further performs orientation detection processing to detect the orientation of the screen area based on the detection result of the first sensor, and display control processing to change display orientation in the screen area according to a change in the orientation of the screen area detected by the orientation detection processing, and when returning from the second operating state or the third operating state to the first operating state, the processor controls, by the display control processing, the display orientation in the screen area according to the orientation of the screen area upon returning.

The above information processing device may further be such that, by executing the program stored in the memory, the processor further performs connection detection processing to detect connection with an external keyboard, and when returning from the second operating state or the third operating state to the first operating state, the processor detects the presence or absence of the connection with the keyboard by the connection detection processing, and when the connection with the keyboard is detected, the processor switches, by the display mode switching processing, to a third display mode in which only a first display area is the display target when the screen area of the display is split into two display areas of the first display area and a second display area.

Further, the above information processing device may be such that the second display mode is a display mode to control display by splitting the screen area of the display into two display areas of a first display area and a second display area, and by the display mode switching processing, the processor performs control by distinguishing between two kinds of two display modes when display is controlled by setting the first display area as a primary screen and the second display area as a secondary screen, and when display is controlled by setting the second display area as the primary screen and the first display area as the secondary screen.

Further, the above information processing device may further include: a first chassis and a second chassis connected to be rotatable relative to each other; and a second sensor which detects a relative rotation state of the first chassis and the second chassis, wherein the display is provided over the first chassis and the second chassis in such a manner that the display is foldable according to the rotation of the first chassis and the second chassis, and by executing the program stored in the memory, the processor further performs detection processing to detect whether or not the display is in the bent state based on the detection result of the second sensor.

Further, an information processing device according to one or more embodiments of the present invention includes: a foldable one display; a memory which stores at least a program; and a processor which executes the program stored in the memory, wherein, by executing the program stored in the memory, the processor performs operating state switching processing to switch the operating state of a system among a first operating state, a second operating state in which processing of the system is more limited than that in the first operating state and at least the display is hidden, and a third operating state in which the processing of the system is shut down, display mode switching processing to switch between a first display mode to control display by setting a screen area of the display as one display area, and a second display mode to control display by splitting the screen area into plural display areas, and setting switching processing to switch among a first setting to provide a control to allow a user to select either one of the first display mode and the second display mode according to a change in state as to whether or not the display is in a bent state, a second setting to perform the display mode switching processing according to the change in the state as to whether or not the display is in the bent state, and a third setting in which the display mode switching processing is not performed even when there is the change in the state as to whether or not the display is in the bent state, and when returning from the second operating state to the first operating state after transition from the first operating state to the second operating state, the processor controls a display mode to the display mode before transition to the second operating state between the first display mode and the second display mode by the display mode switching processing, and when returning from the third operating state to the first operating state after transition from the first operating state or the second operating state to the third operating state, the processor controls the display mode to a preset display mode between the first display mode and the second display mode by the display mode switching processing.

Further, a control method for an information processing device according to one or more embodiments of the present invention is a control method for an information processing device including: a foldable one display; a memory which stores at least a program; and a processor which executes the program stored in the memory, the control method including, by the processor executing the program stored in the memory: a step of switching the operating state of a system among a first operating state, a second operating state in which processing of the system is more limited than that in the first operating state and at least the display is hidden, and a third operating state in which the processing of the system is shut down; a step of switching between a first display mode to control display by setting a screen area of the display as one display area, and a second display mode to control display by splitting the screen area into plural display areas; a step of switching among a first setting to provide a control to allow a user to select either one of the first display mode and the second display mode according to a change in state as to whether or not the display is in a bent state, a second setting to switch between the first display mode and the second display mode according to the change in the state as to whether or not the display is in the bent state, and a third setting in which switching between the first display mode and the second display mode is not performed even when there is the change in the state as to whether or not the display is in the bent state; and a step in which, when returning from the second operating state to the first operating state after transition from the first operating state to the second operating state, a display mode is controlled to the display mode before transition to the second operating state between the first display mode and the second display mode, and a setting is controlled to the setting before transition to the second operating state among the first setting, the second setting, and the third setting.

Further, a control method for an information processing device according to one or more embodiments of the present invention is a control method for an information processing device including: a foldable one display; a memory which stores at least a program; and a processor which executes the program stored in the memory, the control method including, by the processor executing the program stored in the memory: a step of switching the operating state of a system among a first operating state, a second operating state in which processing of the system is more limited than that in the first operating state and at least the display is hidden, and a third operating state in which the processing of the system is shut down; a step of switching between a first display mode to control display by setting a screen area of the display as one display area, and a second display mode to control display by splitting the screen area into plural display areas; a step of switching among a first setting to provide a control to allow a user to select either one of the first display mode and the second display mode according to a change in state as to whether or not the display is in a bent state, a second setting to switch between the first display mode and the second display mode according to the change in the state as to whether or not the display is in the bent state, and a third setting in which switching between the first display mode and the second display mode is not performed even when there is the change in the state as to whether or not the display is in the bent state; a step in which when returning from the second operating state to the first operating state after transition from the first operating state to the second operating state, a display mode is controlled to the display mode before transition to the second operating state between the first display mode and the second display mode; and a step in which when returning from the third operating state to the first operating state after transition from the first operating state or the second operating state to the third operating state, the display mode is controlled to a preset display mode between the first display mode and the second display mode.

The above-described aspects of the present invention can control display on a foldable display properly.

DETAILED DESCRIPTION

Embodiments of the present invention will be described below with reference to the accompanying drawings.

Figure 1:
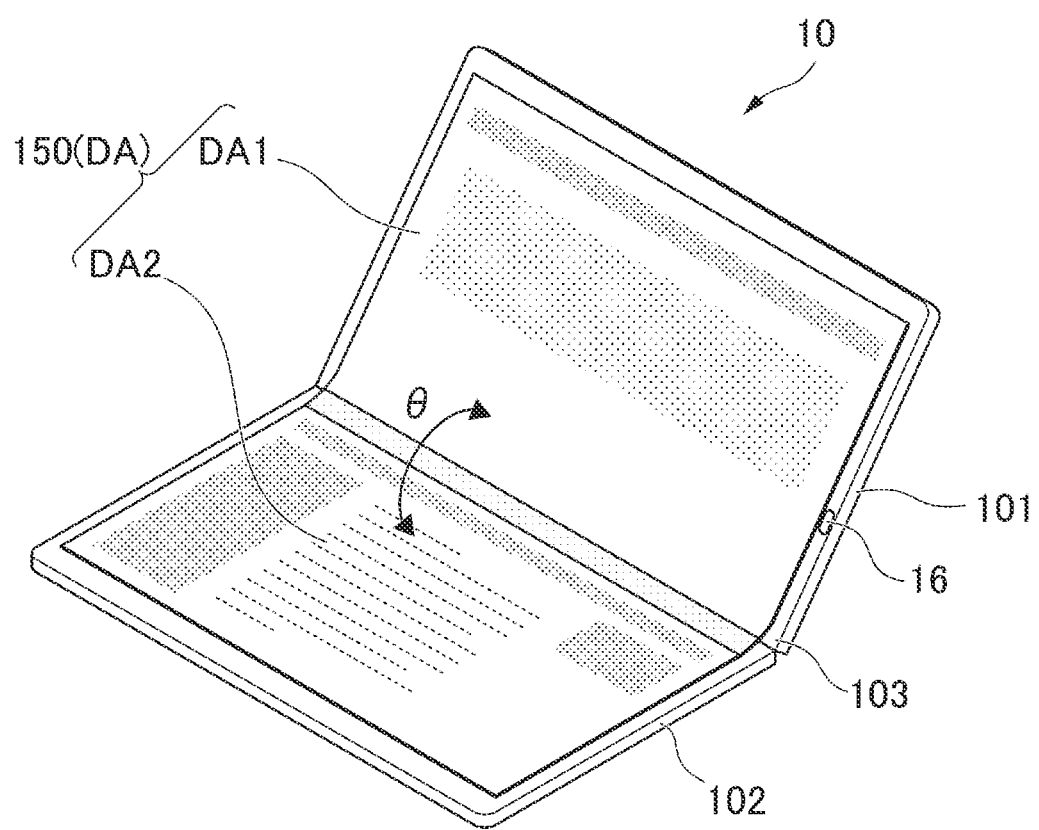
FIG. 1 is a perspective view illustrating the appearance of an information processing device according to one or more embodiments.

FIG. 1 is a perspective view illustrating the appearance of an information processing device 10 according to one or more embodiments. The information processing device 10 according to one or more embodiments is a clamshell (laptop) PC (Personal Computer). The information processing device 10 includes a first chassis 101, a second chassis 102, and a hinge mechanism 103. The first chassis 101 and the second chassis 102 are chassis having a substantially rectangular plate shape (for example, a flat plate shape). One of the sides of the first chassis 101 and one of the sides of the second chassis 102 are joined (coupled) through the hinge mechanism 103 in such a manner that the first chassis 101 and the second chassis 102 are rotatable relative to each other around the axis of rotation of the hinge mechanism 103. A state where an open angle θ between the first chassis 101 and the second chassis 102 around the axis of rotation is substantially 0° is a state where the first chassis 101 and the second chassis 102 are closed in such a manner as to overlap each other. The state where the first chassis 101 and the second chassis 102 are closed is called a "closed state" (closed). Surfaces of the first chassis 101 and the second chassis 102 on the sides to face each other in the closed state are called "inner surfaces," and surfaces on the other sides of the inner surfaces are called "outer surfaces," respectively. The open angle θ can also be called an angle between the inner surface of the first chassis 101 and the inner surface of the second chassis 102. As opposed to the closed state, a state where the first chassis 101 and the second chassis 102 are open is called an "open state." The open state is a state where the first chassis 101 and the second chassis 102 are rotated relative to each other until the open angle θ exceeds a preset threshold value (for example, 10°).

Further, the information processing device 10 includes a camera 16 and a display 150. The camera 16 is provided on the inner surface of the first chassis 101. The display 150 is provided over the inner surface of the first chassis 101 and the inner surface of the second chassis 102. For example, the camera 16 is provided in an outer part of a screen area of the display 150 on the inner surface of the first chassis 101 to be able to capture a user or the like present on the side facing the display 150. The display 150 is a flexible display flexible according to the open angle θ by the relative rotation between the first chassis 101 and the second chassis 102 (see FIG. 2 and FIG. 3). As the flexible display, an organic EL display or the like is used. The information processing device 10 can control not only display as a one-screen structure in the entire screen area as one display area DA of the display 150, but also display as a two-screen structure by splitting the screen area of the display 150 into two display areas as a first display area DA1 and a second display area DA2. Here, the first display area DA1 and the second display area DA2 are display areas that do not overlap each other. It is here assumed that a display area corresponding to the inner surface side of the first chassis 101 in the screen area of the display 150 is the first display area DA1, and a display area corresponding to the inner surface side of the second chassis 102 is the second display area DA2. In the following, a display mode to control the display in the one-screen structure is called a "one-screen mode," and a display mode to control the display in the two-screen structure is called a "two-screen mode."

Note that a touch sensor is provided on the screen area of the display unit 150. The information processing device 10 can detect touch operations to the screen area of the display 150. By putting the information processing device 10 into the open state, a user can visually confirm the display of the display unit 150 provided on the respective inner surfaces of the first chassis 101 and the second chassis 102, and perform touch operations to the display 150, thus enabling use of the information processing device 10.

Next, usage forms and screen modes of the information processing device 10 will be described in detail. First, the usage forms of the information processing device 10 are divided into a state in which the first chassis 101 and the second chassis 102 are bent (Bent form) at an open angle θ between the first chassis 101 and the second chassis 102, and a flat state (Flat form) in which the first chassis 101 and the second chassis 102 are not bent. In the following, the state where the first chassis 101 and the second chassis 102 are bent (Bent form) is simply called the "bent state (Bent form)," and the flat state (Flat form) in which the first chassis 101 and the second chassis 102 are not bent is simply called the "flat state (Flat form)." In the bent state (Bent form), the display 150 provided over the first chassis 101 and the second chassis 102 is also in the bent state. In the flat state (Flat form), the display 150 is also in the flat state.

Figure 2:
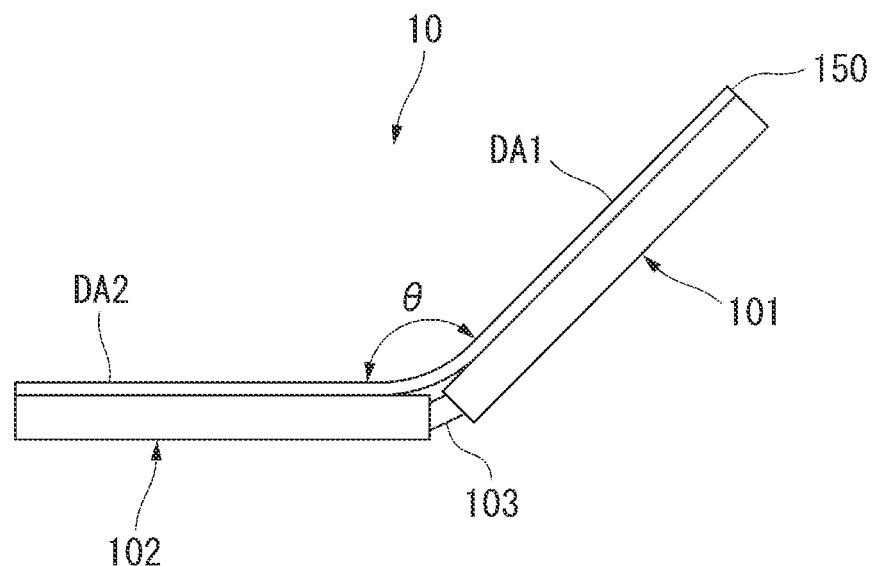
FIG. 2 is a side view illustrating an example of the information processing device in a bent state according to one or more embodiments.

FIG. 2 is a side view illustrating an example of the information processing device 10 in the bent state (Bent form). The display 150 is arranged over (across) the first chassis 101 and the second chassis 102. The screen area of the display 150 (the display area DA illustrated in FIG. 1) can be bent by using a part corresponding to the hinge mechanism 103 as a crease, and on the border of the crease, a display area on the side of the first chassis 101 is the first display area DA1 and a display area on the side of the second chassis 102 is the second display area DA2. The display 150 is bent according to the rotation (open angle θ) between the first chassis 101 and the second chassis 102. The information processing device 10 determines whether or not the state is the bent state (Bent form) depending on the open angle θ. As an example, in the case of 10°<θ<170°, the information processing device 10 determines the bent state (Bent form). This state corresponds to a usage form as a so-called clamshell mode or book mode.

Figure 3:
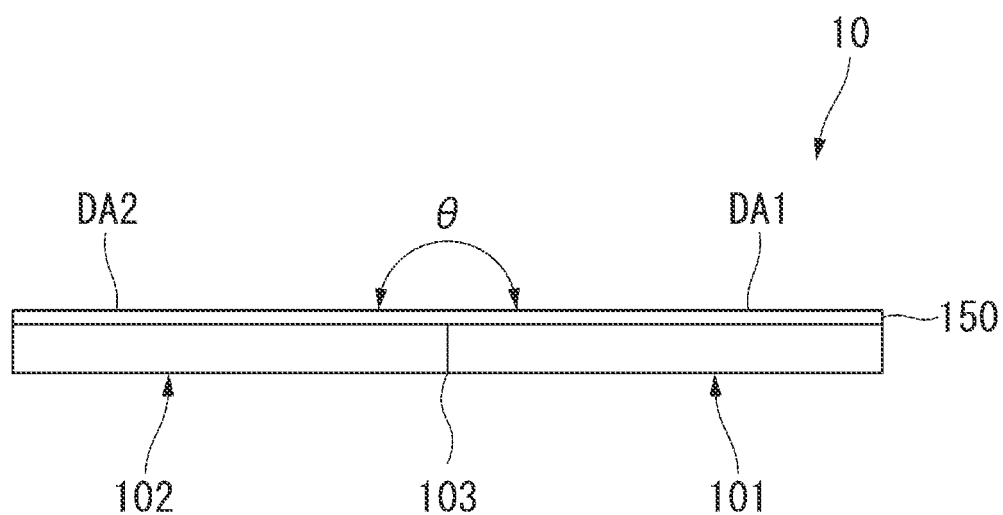
FIG. 3 is a side view illustrating the information processing device in a flat state according to one or more embodiments.

FIG. 3 is a side view illustrating an example of the information processing device 10 in the flat state (Flat form). The information processing device 10 typically determines the flat state (Flat form) when the open angle θ is 180°, but as an example, the information processing device 10 may also determine the flat state (Flat form) in the case of 170°<θ<180°. For example, when the open angle θ between the first chassis 101 and the second chassis 102 is 180°, the display 150 is also in the flat state. This state corresponds to a usage form as a so-called tablet mode.

Figure 4:
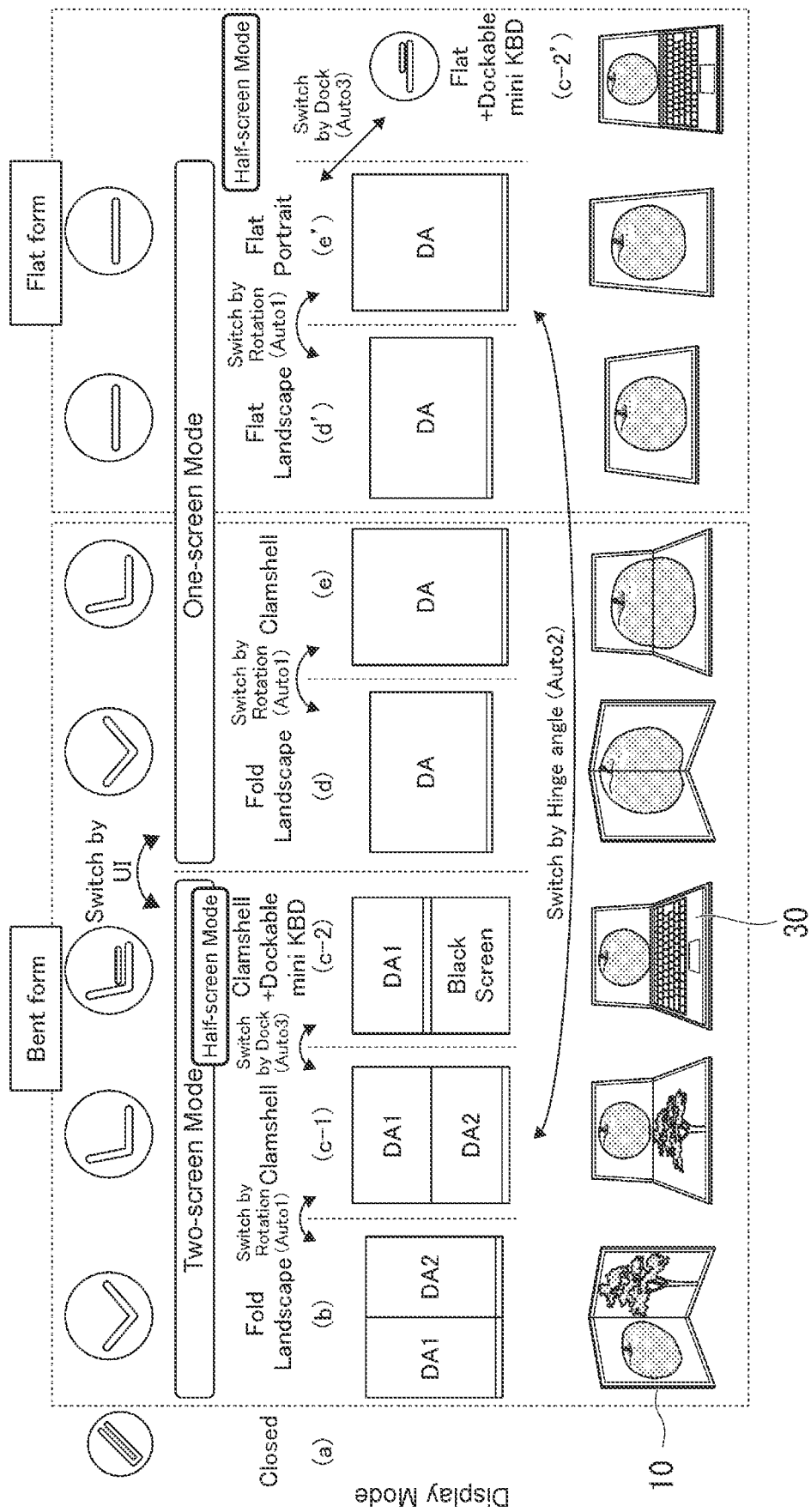
FIG. 4 is a diagram illustrating specific examples of various display modes of the information processing device according to one or more embodiments.

Referring next to FIG. 4, display modes in various usage forms of the information processing device 10 will be described in detail.

FIG. 4 is a diagram illustrating specific examples of various display modes of the information processing device 10 according to one or more embodiments. The display mode of the information processing device 10 varies depending on the usage form classified by the open angle θ between the first chassis 101 and the second chassis 102, the posture (orientation) of the information processing device 10, whether the display mode is the one-screen mode or the two-screen mode, and the like. Note that one screen is also called a single screen, and two screens are also called split screens or dual screens.

Display mode (a) is a display mode when the first chassis 101 and the second chassis 102 are in the closed state (Closed) as the usage form. For example, in this closed state, the information processing device 10 is in a standby state, such as a sleep state or a hibernation state, and the display unit 150 is in a display-off state. This standby state such as the sleep state or the hibernation state corresponds, for example, to S3 or S4 as system power status defined in the ACPI (Advanced Configuration and Power Interface) specifications.

Display mode (b) is a display mode when the first chassis 101 and the second chassis 102 are in the bent state (Bent form) as the usage form and in the two-screen mode in which display is controlled by splitting the screen area of the display 150 into the two display areas of the first display area DA1 and the second display area DA2. Further, the orientation of the information processing device 10 is an orientation in which the first display area DA1 and the second display area DA2 are lined up side by side in portrait orientation. The portrait orientation of the display areas means an orientation in which long sides of the four sides of each of the rectangular display areas are vertical and short sides are horizontal. When the display areas are in portrait orientation, the display orientation is also portrait, that is, the display is provided in such an orientation that the direction along the long sides corresponds to the up-down direction and the direction along the short sides corresponds to the left-right direction. This usage form is a usage form corresponding to the so-called book mode in which left and right pages when opening a book correspond to left and right screens. Since this usage form is in the bent state (Bent form) and the display area of two combined display areas of the first display area DA1 and the second display area DA2 lined up side by side is horizontally long, it is also called "Fold Landscape."

In this display mode (b), for example, the information processing device 10 is in such a two-screen display mode that the first display area DA1 on the left side is set as the primary screen and the second display area DA2 on the right side is set as the secondary screen in normal operating conditions. Note that the correspondences of the first display area DA1 and the second display area DA2 to the primary screen and the secondary screen in the display mode (b) may be reversed.

Like the display mode (b), display mode (c-1) is a display mode in the bent state (Bent form) when the display mode is the two-screen mode in which the display is so controlled that the screen area of the display 150 is split into two display areas of the first display area DA1 and the second display area DA2, but in a usage form different from the display mode (b) in the orientation of the information processing device 10. The orientation of the information processing device 10 is an orientation in which the first display area DA1 and the second display area DA2 are lined up and down in landscape orientation. The landscape orientation of the display areas means an orientation in which long sides of the four sides of each of the rectangular display areas are horizontal and short sides are vertical. When the display areas are in landscape orientation, the display orientation is also landscape, that is, the display is provided in such an orientation that the direction along the short sides corresponds to the up-down direction and the direction along the long sides corresponds to the left-right direction. This usage form is one of typical usage forms of a clamshell PC.

In this display mode (c-1), for example, the information processing device 10 is in such a two-screen display mode that the first display area DA1 is set as the primary screen and the second display area DA2 is set as the secondary screen in normal operating conditions. Note that the correspondences of the first display area DA1 and the second display area DA2 to the primary screen and the secondary screen in the display mode (c-1) may be reversed.

For example, the information processing device 10 detects a change in the posture (orientation) of the information processing device 10 to automatically switch from the display mode (b) to the display mode (c-1) or from the display mode (c-1) to the display mode (b) (Switch by Rotation). For example, since the display mode (c-1) is in such a state that the display 150 is rotated 90 degrees in the right direction from the state of the display mode (b) in FIG. 4, the information processing device 10 switches to the display mode (c-1) when detecting the rotation of a predetermined angle (for example, 45 degrees) or more in the right direction from the state of the display mode (b). Further, since the display mode (b) is in such a state that the display 150 is rotated 90 degrees in the left direction from the state of the display mode (c-1) in FIG. 4, the information processing device 10 switches to the display mode (b) when detecting the rotation of a predetermined angle (for example, 45 degrees) or more in the left direction from the state of the display mode (c-1).

Like the display mode (c-1), display mode (c-2) is in the bent state (Bent form) with the same orientation of the information processing device 10 but different in that an external keyboard 30 (Dockable mini KBD (KeyBoard)) connectable to the information processing device 10 is connected. This usage form is in such a state that a physical keyboard 30 is connected in general usage forms of the clamshell PC. For example, the size of the keyboard 30 is almost equivalent to the size of the second display area DA2, and the keyboard 30 is configured to be mountable on the second display area DA2. As an example, magnets are provided inside (the edges of) the bottom of the keyboard 30, and when the keyboard 30 is mounted on the second display area DA2, the magnets are attracted to metal parts of the inner surface edges of the second chassis 102 to fix the keyboard 30. Thus, the usage form becomes a usage form similar to that of a conventional clamshell PC with a physical keyboard originally provided therein. Further, the information processing device 10 and the keyboard 30 are connected, for example, through Bluetooth (registered trademark). In this display mode (c-2), since the keyboard makes the second display area DA2 invisible, the information processing device 10 controls the second display area DA2 to black display or display off. In other words, this display mode (c-2) is a display mode in which only a half screen is effective to provide a display (hereinafter called a "half-screen mode"), that is, a one-screen mode in which only the first display area DA1 is used.

For example, the information processing device 10 automatically switches from the display mode (c-1) to the display mode (c-2) when detecting the connection to an external keyboard in the state of the display mode (c-1) (Switch by Dock).

Like the display mode (b), display mode (d) is in the bent state (Bent form) with the same orientation of the information processing device 10 but different in that the display mode (d) is the one-screen mode in which the entire screen area of the display 150 is set as one display area DA to control the display. This usage form is in the one-screen mode different from that in the display mode (b). However, since the usage form is in the bent state (Bent form) and the display area DA is horizontally long, it is also called "Fold Landscape." The display area DA is in landscape orientation and the display orientation is also landscape.

Here, for example, switching between the one-screen mode and the two-screen mode in the bent state (Bent form) is performed with a user operation. For example, the information processing device 10 displays an operator as a UI (User Interface) capable of switching between the one-screen mode and the two-screen mode somewhere on the screen to switch from the display mode (b) to the display mode (d) based on an operation to the operator (Switch by UI). A specific example of this display mode switching operation will be described later.

Like the display mode (c-1), display mode (e) is in the bent state (Bent form) with the same orientation of the information processing device 10 but different in that the display mode (e) is the one-screen mode in which the entire screen area of the display 150 is set as one display area DA to control the display. This usage form is different from the display mode (c-1) in that it is the one-screen mode, but the usage form corresponds to the usage form of the clamshell PC from the bent state (Bent form) and the orientation of the information processing device 10. The display area DA is in portrait orientation and the display orientation is also portrait.

For example, the information processing device 10 detects a change in the posture (orientation) of the information processing device 10 to automatically switch from the display mode (d) to the display mode (e) or from the display mode (e) to the display mode (d) (Switch by Rotation). For example, since the display mode (e) is in such a state that the display 150 is rotated 90 degrees in the right direction from the state of the display mode (d) in FIG. 4, the information processing device 10 switches to the display mode (e) when detecting the rotation of a predetermined angle (for example, 45 degrees) or more in the right direction from the state of the display mode (d). Further, since the display mode (d) is in such a state that the display 150 is rotated 90 degrees in the left direction from the state of the display mode (e), the information processing device 10 switches to the display mode (d) when detecting the rotation of a predetermined angle (for example, 45 degrees) or more in the left direction from the state of the display mode (e).

Like the display mode (d), display mode (d') is in the one-screen mode and the orientation of the information processing device 10 is such an orientation that the display area DA is horizontally long, but different in that the information processing device 10 is in the flat state (Flat form). The flat state (Flat form) is a state in which the open angle θ between the first chassis 101 and the second chassis 102 is substantially 180°. This usage form corresponds to the so-called tablet mode described with reference to FIG. 3. Since this usage form is in the flat state (Flat form) and the display area DA is horizontally long, it is also called "Flat Landscape." This display mode (d') differs from the display mode (d) only in the open angle θ between the first chassis 101 and the second chassis 102. Like in the display mode (d), the display area DA in the display mode (d') is in landscape orientation and the display orientation is also landscape.

Like the display mode (e), display mode (e') is in the one-screen mode and the orientation of the information processing device 10 is such an orientation that the display area DA is vertically long, but different in that the information processing device 10 is in the flat state (Flat form). Since this usage form is in the flat state (Flat form) and the display area DA is vertically long, it is also called "Flat Portrait." This display mode (e') differs from the display mode (e) only in the open angle θ between the first chassis 101 and the second chassis 102. Like in the display mode (e), the display area DA in the display mode (e') is in portrait orientation and the display orientation is also portrait.

For example, the information processing device 10 detects a change in the posture (orientation) of the information processing device 10 to automatically switch from the display mode (d') to the display mode (e') or from the display mode (e') to the display mode (d') (Switch by Rotation). For example, since the display mode (e') is in such a state that the display 150 is rotated 90 degrees in the right direction from the state of the display mode (d') in FIG. 4, the information processing device 10 switches to the display mode (e') when detecting the rotation of a predetermined angle (for example, 45 degrees) or more in the right direction from the state of the display mode (d'). Further, since the display mode (d') is in such a state that the display 150 is rotated 90 degrees in the left direction from the state of the display mode (e'), the information processing device 10 switches to the display mode (d') when detecting the rotation of a predetermined angle (for example, 45 degrees) or more in the left direction from the state of the display mode (e').

Note that in the display mode (d') and the display mode (e'), it is also possible to switch to the two-screen mode while keeping the flat state (Flat form) by the user operating a display mode switching icon to be described later. For example, when switching to the two-screen mode from the state of the display mode (d'), becomes similar to the display mode (b) though the usage form is in the flat state (Flat form). Further, when switching to the two-screen mode from the state of the display mode (e'), the display state becomes similar to the display mode (c-1) though the usage form is in the flat state (Flat form).

Further, when detecting the connection with the keyboard 30 in the state of the display mode (e'), the information processing device 10 automatically switches from the display mode (e') to display mode (c-2') (Switch by Dock). The display mode (c-2') is in the flat state (Flat form) but different from the display mode (c-2) only in the open angle θ between the first chassis 101 and the second chassis 102. In this display mode (c-2'), since the second display area DA2 becomes invisible by the keyboard, the information processing device 10 performs control to provide a black display or turn off the display. In other words, like the display mode (c-2), this display mode (c-2') is a half-screen mode in which only one screen as a half screen is effective to provide a display.

Further, when detecting a change from the flat state (Flat form) to the bent state (Bent form), the information processing device 10 can switch from the one-screen mode to the two-screen mode. For example, when detecting a change to the bent state (Bent form) in the state of the display mode (d') based on the open angle θ between the first chassis 101 and the second chassis 102, the information processing device 10 automatically switches from the display mode (d') to the display mode (b). Further, when detecting a change to the bent state (Bent form) in the state of the display mode (e') based on the open angle θ between the first chassis 101 and the second chassis 102, the information processing device 10 automatically switches from the display mode (e') to the display mode (c-1).

(Display Mode Switching Operation)

Next, a specific example of operation specifications upon switching the display mode with user operations will be described.

Figure 5A:
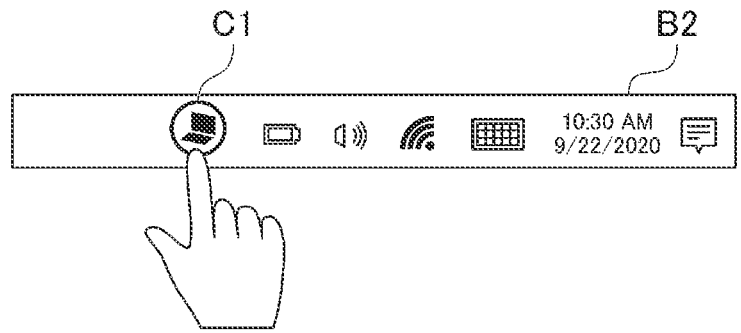
FIGS. 5(A)-(C) are diagrams illustrating an example of the operation specifications of display mode switching operations according to one or more embodiments.

FIG. 5 is a diagram illustrating an example of the operation specifications of display mode switching operations according to one or more embodiments. For example, as illustrated in FIG. 5(A), icon C1 to display a display mode switching menu is displayed on a task bar B2. The task bar B2 is displayed somewhere in the screen area of the display 150. For example, even in either of the one-screen mode or the two-screen mode, the task bar B2 is displayed only in one place inside the screen area of the display 150 (for example, on the bottom of the display area). However, in the case of the two-screen mode, the task bar B2 may also be displayed respectively in the first display area DA1 and the second display area DA2 (for example, on respective bottoms).

When the icon C1 is operated to display the switching menu, the display mode switching menu is displayed as a pop-up screen. Note that the display mode switching menu may also be displayed as a pop-up screen upon a change from the bent state (Bent form) to the flat state (Flat form) in which the information processing device 10 is not bent. Further, the display mode switching menu may be displayed as a pop-up screen upon a change from the flat state (Flat form) to the bent state (Bent form).

On the switching menu, display mode switching icons are displayed as choices of the display mode to allow the user to instruct switching between the one-screen mode and the two-screen mode, and the replacement of pieces of display data to be displayed respectively in the first display area DA1 and the second display area DA2 in the two-screen mode (replacement of the primary screen and the secondary screen). On the switching menu, choices of the display mode selectable by the user depending on the usage form (the orientation of the display 150) at the time are displayed.

Figure 5B:
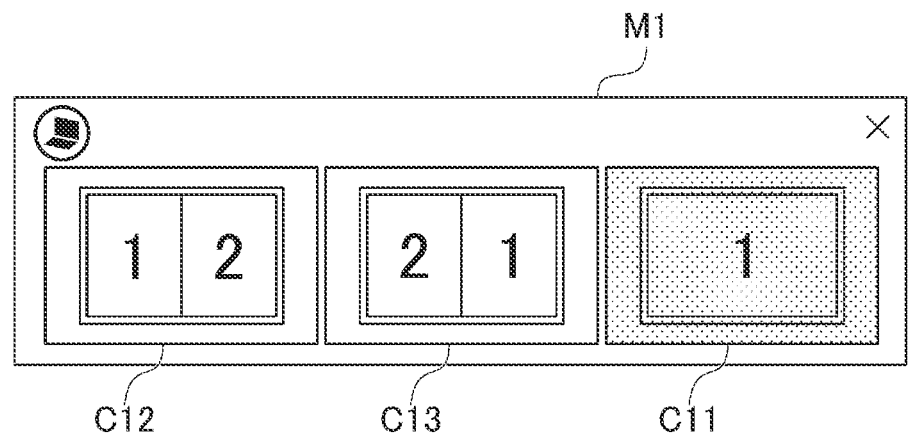

FIG. 5(B) illustrates switching menu M1 displayed when the usage form is "Landscape" (display mode (b), display mode (d), display mode (d'), etc.). Note that "1" in FIG. 5(B) indicates the primary screen, and "2" indicates the secondary screen. On the switching menu M1, display mode switching icon C11, display mode switching icon C12, and display mode switching icon C13 are displayed. The display mode switching icon C11 is displayed as an operator for selecting the one-screen mode (the display mode (d) or the display mode (d')). The display mode switching icon C12 is displayed as an operator for selecting such a display mode that the first display area DA1 is the primary screen and the second display area DA2 is the secondary screen in the two-screen mode (the display mode (b)). The display mode switching icon C13 is displayed as an operator for selecting such a display mode that the second display area DA2 is the primary screen and the first display area DA1 is the secondary screen in the two-screen mode (the display mode (b)). In the following, the two-screen mode in which the second display area DA2 is the primary screen and the first display area DA1 is the secondary screen is called an "inverted two-screen mode" when there is a need to distinguish from the two-screen mode in which the first display area DA1 is the primary screen and the second display area DA2 is the secondary screen.

Note that the display mode switching icon corresponding to the current display mode is displayed in a display form distinguishable from the other display mode switching icons. Here, the display mode switching icon C11 is highlighted against the other display mode switching icons C12 and C13 to make the user understand the current display mode.

Figure 5C:
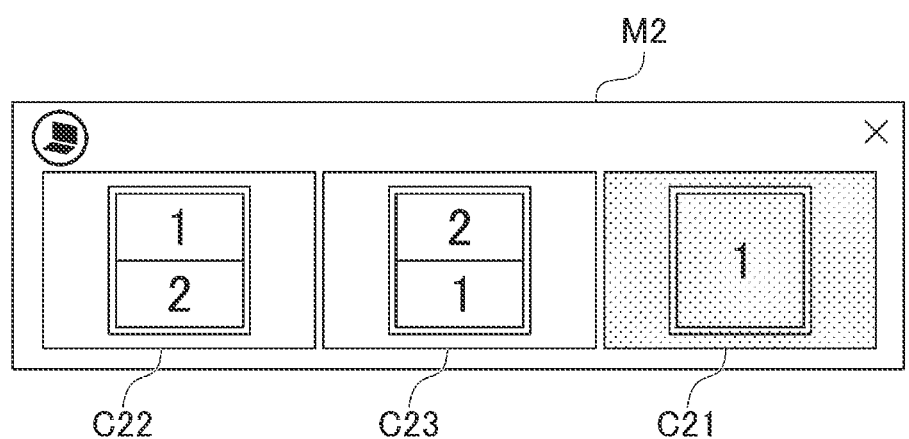

FIG. 5(C) illustrates switching menu M2 to be displayed when the usage form is "Clamshell" (display mode (c-1), display mode (e), display mode (e'), etc.). On the switching menu M2, display mode switching icon C21, display mode switching icon C22, and display mode switching icon C23 are displayed. The display mode switching icon C21 is displayed as an operator for selecting the one-screen mode (the display mode (e) or the display mode (e')). The display mode switching icon C22 is displayed as an operator for selecting such a display mode that the first display area DA1 is the primary screen and the second display area DA2 is the secondary screen in the two-screen mode (the display mode (c-1)). The display mode switching icon C23 is displayed as an operator for selecting such a display mode that the second display area DA2 is the primary screen and the first display area DA1 is the secondary screen in the two-screen mode (the display mode (c-1)) (that is, the inverted two-screen mode).

Like the switching menu M1 illustrated in FIG. 5(B), the display mode switching icon corresponding to the current display mode is displayed in a display form distinguishable from the other display mode switching icons. Here, the display mode switching icon C21 is highlighted against the other display mode switching icons C22 and C23 to make the user understand the current display mode.

The user can arbitrarily select any of the display mode switching icons displayed on the switching menu M1 or the switching menu M2. When the user selects any of the display mode switching icons, the display of the switching menu is ended. Otherwise, when the user does not select any of the display mode switching icons even after the passage of a predetermined time period (for example, three to five seconds) after the switching menu M1 or the switching menu M2 is displayed, the display of the switching menu is ended. Further, in a case where the user operates a close button "x" in the top right of the switching menu, when the user performs an operation outside the screen of the pop-up switching menu, or when the orientation of the information processing device 10 is changed, the display of the switching menu is ended. Note that in the state where the keyboard 30 is connected, since the screen mode is fixed to the half-screen mode (display mode (c-2)) in which only the display of the first display area DA1 is enabled, no switching menu is displayed.

Note that the UI to switch between the one-screen mode and the two-screen mode is not limited to the example illustrated in FIG. 5, and any other UI can be used. For example, an icon to switch between the one-screen mode and the two-screen mode alternately each time it is operated, or an icon to switch among the one-screen mode, the two-screen mode, and the inverted two-screen mode in order each time it is operated may also be displayed on the task bar B2.

(Display Mode Switching Settings)

Figure 6:
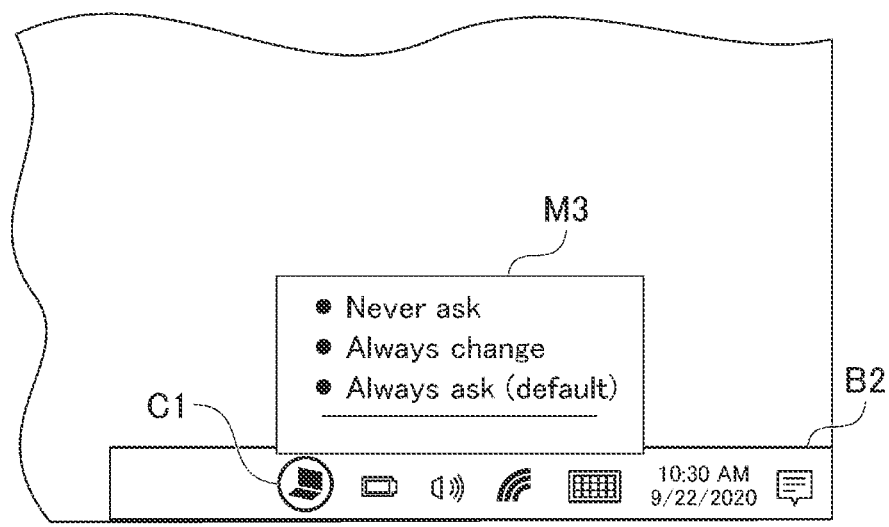
FIG. 6 is a diagram illustrating an example of the operation specifications of display mode switching settings according to one or more embodiments.

In one or more embodiments, when a change from the bent state (Bent form) to the flat state (Flat form) is made, or when a change from the flat state (Flat form) to the bent state (Bent form) is made, the user can select a setting from among plural settings for control of whether or not to switch the display mode. Referring here to FIG. 6, an example of the operation specifications of display mode switching settings selectable by the user will be described.

FIG. 6 is a diagram illustrating an example of the operation specifications of display mode switching settings according to one or more embodiments. In FIG. 6, the icon C1 illustrated in FIG. 5(A) is displayed on the task bar B2 displayed in the screen area of the display 150, and a settings menu M3 is displayed as a pop-up display by performing an operation to press and hold the icon C1 or to right-click on the icon C1. For example, on the settings menu M3, a first setting (Always ask), a second setting (Always change), and a third setting (Never ask) are displayed as setting choices selectable by the user.

The first setting (Always ask) is a setting to make either one of the one-screen mode and the two-screen mode (or the inverted two-screen mode) selectable by the user according to the change in the state as to whether or not the display 150 is in the bent state. For example, when the change from the bent state (Bent form) to the flat state (Flat form) is made, or when the change from the flat state (Flat form) to the bent state (Bent form) is made, the switching menu M1 illustrated in FIG. 5(B) or the switching menu M2 illustrated in FIG. 5(C) is displayed to enable the user to select a display mode. Which of the switching menu M1 and the switching menu M2 is displayed is determined depending on the orientation of the display 150 at the time. Although this first setting is a default setting, the first setting is set as default only after OOBE (Out-Of-Box Experience).

The second setting (Always change) is a setting to switch between the one-screen mode and the two-screen mode (or the inverted two-screen mode) according to the change in the state as to whether or not the display 150 is in the bent state. For example, when the change from the bent state (Bent form) to the flat state (Flat form) is made, the screen mode is always the one-screen mode, while when the change from the flat state (Flat form) to the bent state (Bent form) is made, the screen mode is always the two-screen mode (or the inverted two-screen mode).

The third setting (Never ask) is a setting not to switch between the one-screen mode and the two-screen mode (or the inverted two-screen mode) even when there is the change in the state as to whether or not the display 150 is in the bent state. Even when there is the change in the state as to whether or not the display 150 is in the bent state, the screen mode does not change, and neither the switching menu M1 illustrated in FIG. 5(B) nor the switching menu M2 illustrated in FIG. 5(C) is displayed. In other words, even in the case where there is the change in the state as to whether or not the display 150 is in the bent state, the screen mode remains in the one-screen mode when it is the one-screen mode, and the screen mode remains in the two-screen mode when it is the two-screen mode.

The user can perform an operation to select any one of the first setting (Always ask), the second setting (Always change), and the third setting (Never ask) displayed on the settings menu M3 to switch to the selected setting. The selected setting is held even after the information processing device 10 is put in the standby state or a shutdown state, and even after restarting the information processing device 10.

The standby state is a state where at least part of system processing is more limited than that in a normal operating state, which includes a state in which at least the display of the display 150 is turned off (hidden). The normal operating state is an operating state in which processing can be executed without any particular restrictions, which corresponds, for example, to S0 state defined in ACPI. The standby state is a sleep state or a hibernation state, which corresponds, for example, to S3 or S4 defined in ACPI. Further, the shutdown state is a state where the system is shut down and the power is turned off, which corresponds, for example, to S5 defined in ACPI.

When the user performs the operation to select any one of the first setting, the second setting, and the third setting on the settings menu M3, the settings menu M3 is closed and hidden, or even when the user performs an operation in a screen area outside the area of the settings menu M3, the settings menu M3 is closed and hidden.

(Configuration of Information Processing Device 10)

A specific configuration of the information processing device 10 will be described below.

Figure 7:
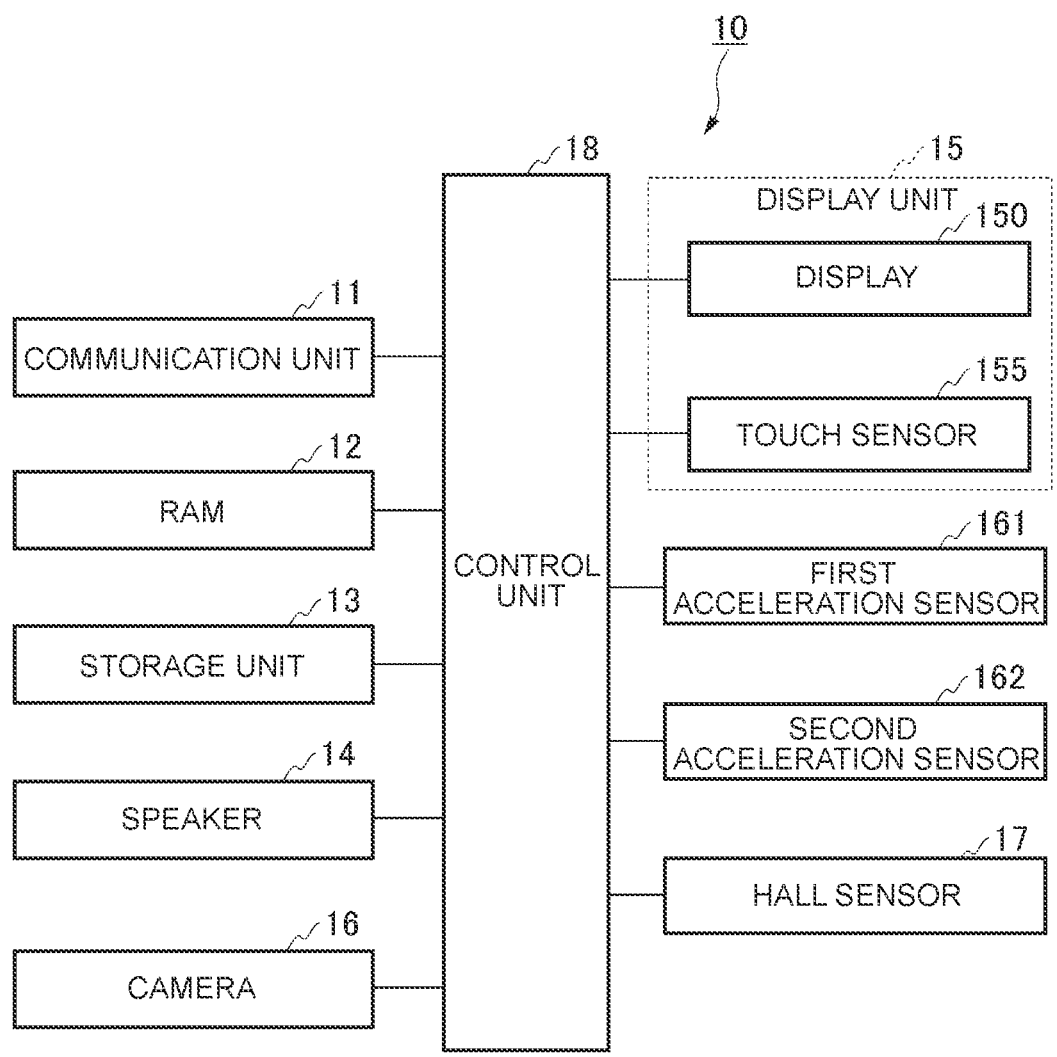
FIG. 7 is a block diagram illustrating a hardware configuration example of the information processing device according to one or more embodiments.

FIG. 7 is a block diagram illustrating an example of the hardware configuration of the information processing device 10 according to one or more embodiments. The information processing device 10 includes a communication unit 11, a RAM (Random Access Memory) 12, a storage unit 13, a speaker 14, a display unit 15, a camera 16, a first acceleration sensor 161, a second acceleration sensor 162, a Hall sensor 17, and a control unit 18. These units are connected communicably to one another through a bus or the like.

The communication unit 11 is, for example, configured to include digital input/output ports such as two or more Ethernet (registered trademark) ports and two or more USB (Universal Serial Bus) ports, communication devices for performing wireless communication such as Bluetooth (registered trademark) and Wi-Fi (registered trademark), and the like. For example, the communication unit 11 can communicate with the above-described external keyboard 30 and the like by using Bluetooth (registered trademark).

In the RAM 12, programs and data for processing executed by the control unit 18 are expanded, and various data are saved or deleted as appropriate. For example, the RAM 12 functions also as a video memory (V-RAM) for the display of the display 150. As an example, the RAM 12 functions as a video memory for data displayed in the display area DA when the display 150 is controlled in the one-screen mode. Further, the RAM 12 functions as a video memory for data displayed in the first display area DA1 and the second display area DA2 when the display 150 is controlled in the two-screen mode. Further, information on running apps, an app in use (an app as an active window) among the running apps, information on the other apps as inactive windows, information about in which display area each window is displayed, and the like are stored in the RAM 12. Note that, since the RAM 12 is a volatile memory, no data is held after the supply of power to the RAM 12 is stopped. Data necessary to be held when the power supply to the RAM 12 is stopped is moved to the storage unit 13.

The storage unit 13 is configured to include one or more of an SSD (Solid State Drive), an HDD (Hard Disk Drive), a ROM (Read Only Memory), a Flash-ROM, and the like. For example, in the storage unit 13, a BIOS (Basic Input Output System) program and setting data, an OS (Operating System) and app programs running on the OS, various data used in the apps, and the like are stored.

The speaker 14 outputs electronic sound, voice, and the like.

The display unit 15 includes the display 150 and a touch sensor 155. As described above, the display 150 is a flexible display flexible according to the open angle θ by the relative rotation between the first chassis 101 and the second chassis 102. Under the control of the control unit 18, the display 150 provides a display corresponding to each display mode described with reference to FIG. 4. The touch sensor 155 is provided on the screen of the display 150 to detect a touch operation on the screen. For example, in the one-screen mode, the touch sensor 155 detects a touch operation in the display area DA. Further, in the two-screen mode, the touch sensor 155 detects a touch operation(s) in either or both of the first display area DA1 and the second display area DA2. The touch operations include a tap operation, a slide operation, a flick operation, a swipe operation, a pinch operation, and the like. The touch sensor 155 detects a touch operation and outputs, to the control unit 18, operation information based on the detected operation.

The camera 16 is configured to include a lens, an image sensor, and the like. The camera 16 captures an image (still image or video) under the control of the control unit 18 and outputs data of the captured image.

The first acceleration sensor 161 is provided inside the first chassis 101 to detect the orientation of the first chassis 101 and a change in orientation. For example, when a direction parallel to the long-side direction of the first display area DA1 is set as an X1 direction, a direction parallel to the short-side direction of the first display area DA1 is set as a Y1 direction, and a direction perpendicular to the X1 direction and the Y1 direction is set as a Z1 direction, the first acceleration sensor 161 detects acceleration in the X1 direction, the Y1 direction, and the Z1 direction, respectively, and outputs the detection results to the control unit 18.

The second acceleration sensor 162 is provided inside the second chassis 102 to detect the orientation of the second chassis 102 and a change in orientation. For example, when a direction parallel to the long-side direction of the second display area DA2 is set as an X2 direction, a direction parallel to the short-side direction of the second display area DA2 is set as a Y2 direction, and a direction perpendicular to the X2 direction and the Y2 direction is set as a Z2 direction, the second acceleration sensor 162 detects acceleration in the X2 direction, the Y2 direction, and the Z2 direction, respectively, and outputs the detection results to the control unit 18.

The Hall sensor 17 is provided to detect the connection of the keyboard 30. For example, when the keyboard 30 is mounted on the second display area DA2 of the second chassis 102, a magnetic field changes due to the approach of a magnet provided inside the bottom of the keyboard 30 to change the detection value (output value) of the Hall sensor 17. In other words, the Hall sensor 17 outputs a different detection result depending on whether or not the keyboard 30 is mounted.

The control unit 18 is configured to include processors such as a CPU (Central Processing Unit), a GPU (Graphic Processing Unit), and a microcomputer to implement various functions by executing programs (BIOS, OS, and various programs running on the OS) stored in the storage unit 13 and the like. For example, based on the detection results of the first acceleration sensor 161 and the second acceleration sensor 162, the control unit 18 detects the posture (orientation) of the information processing device 10. Further, based on the detection results of the first acceleration sensor 161 and the second acceleration sensor 162, the control unit 18 detects whether the information processing device 10 is in the open state or the closed state, and in the open state, the control unit 18 detects whether the information processing device 10 is in the bent state (Bent form) or the flat state (Flat form).

Further, the control unit 18 detects a display mode switching operation by the user (for example, an operation on a display mode switching icon illustrated in FIG. 5). Further, based on the detection result of the Hall sensor 17, the control unit 18 detects the connection with the keyboard 30. Note that the connection with this keyboard 30 means the mounting of the keyboard 30 on the second display area DA2, but does not mean communication connection. As for the communication connection with the keyboard 30, the control unit 18 detects it using the function of Bluetooth (registered trademark) or the like.

Further, the control unit 18 performs display control on the display 150 described with reference to FIG. 4 and FIG. 5 by detecting the system state, the posture (orientation) of the information processing device 10, whether the information processing device 10 is in the open state or the closed state, whether the information processing device 10 is in the bent state (Bent form) or the flat state (Flat form) in the case of the open state, the display mode switching operation by the user, the connection with the keyboard 30, and the like.

Next, a functional configuration related to display control processing among pieces of processing executed by the control unit 18 will be described.

Figure 8:
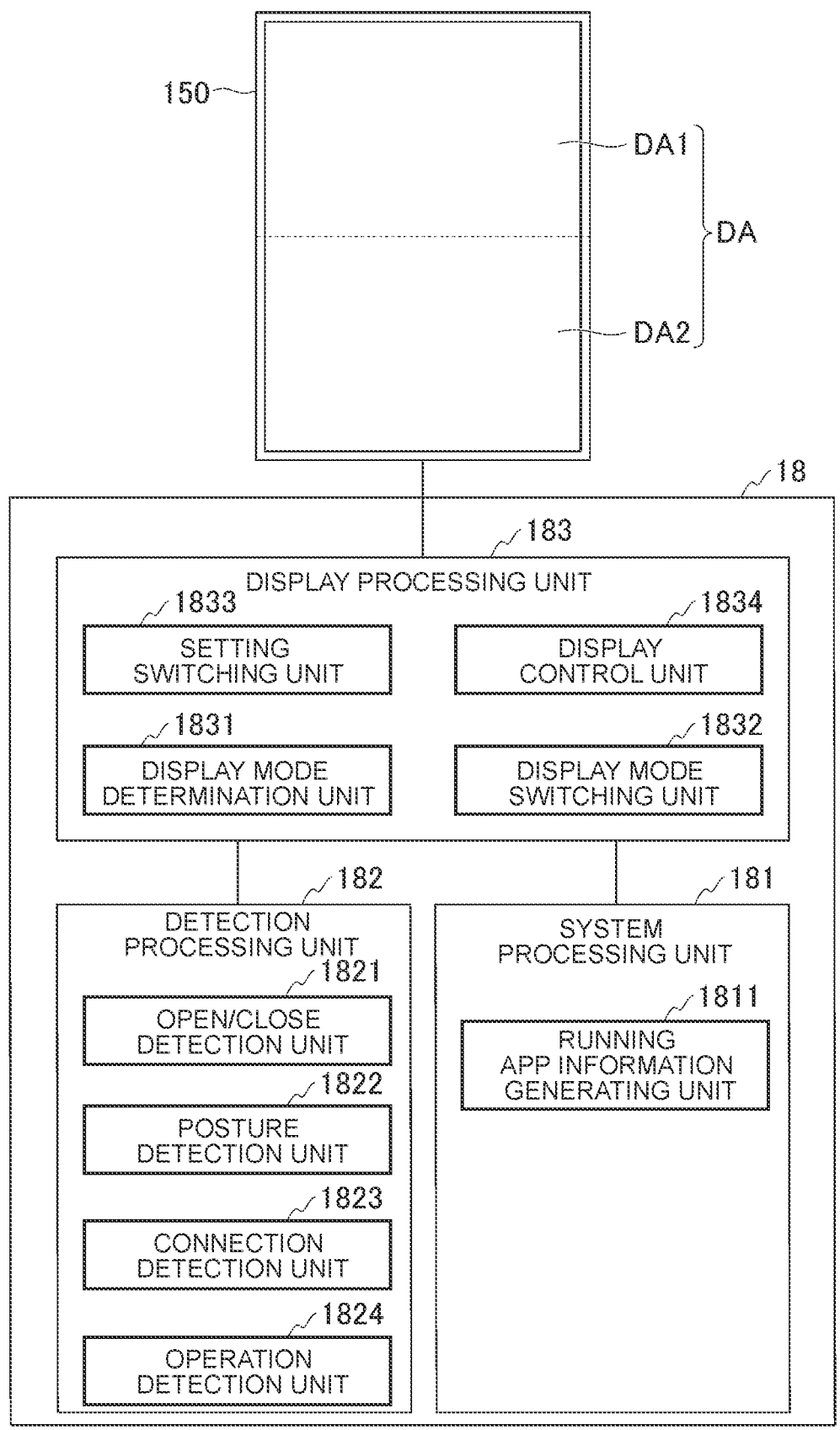
FIG. 8 is a block diagram illustrating a functional configuration example related to display control processing according to one or more embodiments.

FIG. 8 is a block diagram illustrating an example of a functional configuration related to the display control processing according to one or more embodiments. The control unit 18 includes a system processing unit 181, a detection processing unit 182, and a display processing unit 183. Here, the system processing unit 181 is a functional component the processing of which is executed by the CPU based, for example, on the OS or the BIOS. Further, the detection processing unit 182 is a functional component to cause a microcomputer other than the CPU that executes processing based, for example, on the OS or the BIOS to execute various detection processing. The display processing unit 183 is a functional component the processing of which is executed by the CPU based, for example, on a program running on the OS.

The system processing unit 181 boots the OS to cause the operating state of the OS to make a transition to the normal operating state. In the normal operating state, the system processing unit 181 executes various programs such as drivers and apps running on the OS. Further, the system processing unit 181 causes the operating state of the OS to make a transition from the normal operating state to the standby state or the shutdown state, or to return from the standby state or the shutdown state to the normal operating state. Further, the system processing unit 181 has a running app information generating unit 1811. The running app information generating unit 1811 generates app information including identification information of running apps (for example, app IDs), information indicative of an app being used by the user among running apps (i.e., an app the window of which is active), and the like. The running app information generating unit 1811 stores and holds the generated app information and the like in the RAM 12.

The detection processing unit 182 has an open/close detection unit 1821, a posture detection unit 1822, and a connection detection unit 1823 as functional components to detect the state of the information processing device 10. The open/close detection unit 1821 detects whether the information processing device 10 is in the open state or the closed state based on the detection results of the first acceleration sensor 161 and the second acceleration sensor 162. Further, when the information processing device 10 is in the open state, the open/close detection unit 1821 detects the open angle θ between the first chassis 101 and the second chassis 102 based on the detection results of the first acceleration sensor 161 and the second acceleration sensor 162. Then, based on the detected open angle θ, the open/close detection unit 1821 detects whether the first chassis 101 and the second chassis 102 are in the bent state (Bent form) or the flat state (Flat form). The posture detection unit 1822 detects the posture (orientation) of the information processing device 10 based on the detection results of the first acceleration sensor 161 and the second acceleration sensor 162. The connection detection unit 1823 detects the connection with the keyboard 30. For example, based on the detection result of the Hall sensor 17, the connection detection unit 1823 detects whether or not the keyboard 30 is mounted on the second display area DA2 to detect the connection with the keyboard 30. The detection processing unit 182 outputs, to the display processing unit 183, the detection results (the state of the information processing device 10) by the open/close detection unit 1821, the posture detection unit 1822, and the connection detection unit 1823.

The detection processing unit 182 further has an operation detection unit 1824 as a functional component to detect an operation to the information processing device 10. The operation detection unit 1824 detects a user operation based on the operation information output from the touch sensor 155 provided on the screen of the display 150. For example, the operation detection unit 1824 acquires operation information based on a user operation on the switching menu M1 or M2 (see FIG. 5) switchable between display modes to detect a display mode switching operation by the user based on the acquired operation information. Further, the operation detection unit 1824 acquires operation information based on a user operation on the settings menu M3 (see FIG. 6) on which a display mode switching setting is selectable, and based on the acquired operation information, the operation detection unit 1824 detects a display mode switching setting operation by the user to select a display mode switching setting. The detection processing unit 182 outputs the detected user operation information to the display processing unit 183.

The display processing unit 183 determines a display mode and switches between the display modes based on the open/closed state and the posture (orientation) of the information processing device 10, the user operation, and the like acquired from the detection processing unit 182. Further, based on the app information acquired from the system processing unit 181, the display processing unit 183 controls the display of the windows of running apps (active window and inactive windows) according to the display mode. Specifically, the display processing unit 183 has a display mode determination unit 1831, a display mode switching unit 1832, a setting switching unit 1833, and a display control unit 1834.

The display mode determination unit 1831 performs determination processing to determine the display mode based on the state of the information processing device 10 detected by the detection processing unit 182 or the detection result of the user operation. For example, the display mode determination unit 1831 acquires, from the detection processing unit 182, the detection result of the open/closed state of the information processing device 10, the detection result of whether the first chassis 101 and the second chassis 102 are in the bent state (Bent form) or the flat state (Flat form) in the case of the open state, the detection result of the posture (orientation) of the information processing device 10, and the operation information based on the user operation on the switching menu M1 or M2 illustrated in FIG. 5. Then, based on the respective detection results and the operation information acquired from the detection processing unit 182, the display mode determination unit 1831 determines the display mode described with reference to FIG. 4.

Note that when the display mode switching setting illustrated in FIG. 6 is set to the second setting (Always change), the display mode determination unit 1831 makes a determination between the one-screen mode and the two-screen mode (or the inverted two-screen mode) as a display mode determination according to the change in the state as to whether or not the state is the bent state (Bent form) or the flat state (Flat form). On the other hand, when the display mode switching setting illustrated in FIG. 6 is the third setting (Never ask), the display mode determination unit 1831 does not make the display mode determination even when there is the change in the state as to whether the state is the bent state (Bent form) or the flat state (Flat form). Further, when the display mode switching setting illustrated in FIG. 6 is the first setting (Always ask), the display mode determination unit 1831 displays the switching menu M1 or the switching menu M2 according to the change in the state as to whether the state is the bent state (Bent form) or the flat state (Flat form). Then, the display mode determination unit 1831 makes the determination between the one-screen mode and the two-screen mode (or the inverted two-screen mode) as the display mode determination based on the display mode switching icon selected according to the user operation on the switching menu M1 or the switching menu M2.

The display mode switching unit 1832 performs display mode switching processing to switch between the display modes described with reference to FIG. 4 based on the display mode determined by the display mode determination unit 1831. For example, based on the display mode determined by the display mode determination unit 1831, the display mode switching unit 1832 sets a display mode such as switching between the one-screen mode and the two-screen mode (or the inverted two-screen mode), the orientation of each display area, and the display content of each display area.

Further, upon transition of the operating state of the OS from the normal operating state to the standby state, the display mode switching unit 1832 holds screen mode information indicative of whether the screen mode is the one-screen mode, the two-screen mode, or the inverted two-screen mode. For example, the display mode switching unit 1832 stores and holds the screen mode information in the RAM 12. Then, when returning from the standby state to the normal operating state after transition from the normal operating state to the standby state, the display mode switching unit 1832 refers to the held screen mode information to control to the screen mode before transition to the standby state among the one-screen mode, the two-screen mode, and the inverted two-screen mode. On the other hand, upon transition of the operating state of the OS from the normal operating state to the shutdown state, the display mode switching unit 1832 does not hold the screen mode information indicative of whether the screen mode is the one-screen mode, the two-screen mode, or the inverted two-screen mode. Note that the display mode switching unit 1832 may also hold the screen mode information upon transition to the shutdown state, but the held screen mode information is not used upon returning from the shutdown state to the normal operating state. Then, when returning from the shutdown state to the normal operating state after transition from the normal operating state to the shutdown state, the display mode switching unit 1832 controls to a screen mode preset among the one-screen mode, the two-screen mode, and the inverted two-screen mode. The preset screen mode is a default screen mode, which is the one-screen mode, for example.

Further, when returning from the standby state to the normal operating state after transition from the normal operating state to the standby state, the presence or absence of the connection with the keyboard 30 is detected by the connection detection unit 1823. When the connection with the keyboard 30 is detected, the display mode switching unit 1832 switches to the half-screen mode (display mode (C-2)).

Note that when returning to the normal operating state, the display mode switching unit 1832 controls the display mode according also to the posture (orientation) of the information processing device 10 upon returning. For example, when the display mode is the display mode (c-1) of Portrait (Clamshell) upon transition from the normal operating state to the standby state, and then when the orientation of the information processing device 10 is changed to Landscape upon returning from the standby state to the normal operating state next, the display mode switching unit 1832 controls to the display mode (b), rather than the display mode (c-1), though the screen mode is the same two-screen mode. In other words, the display mode switching unit 1832 controls to the screen mode before transition to the standby state, that is, the one-screen mode or the two-screen mode (or the inverted two-screen mode) unless the keyboard 30 is connected upon returning from the standby state, but controls to a display mode different from the display mode before transition to the standby state depending on the orientation of the information processing device 10.

The setting switching unit 1833 switches among the first setting (Always ask), the second setting (Always change), and the third setting (Never ask) based on the user operation on the settings menu M3 illustrated in FIG. 6.

Further, upon transition from the normal operating state to the standby state, the setting switching unit 1833 holds setting information indicative of whether it is set to the first setting, the second setting, or the third setting. Similarly, upon transition from the normal operating state to the shutdown state, the setting switching unit 1833 holds the setting information indicative of whether it is set to the first setting, the second setting, or the third setting. For example, the setting switching unit 1833 stores and holds the setting information in the storage unit 13 (SSD, HDD, Flash-ROM, or the like). Especially, upon transition at shutdown, the setting switching unit 1833 holds the setting information in the nonvolatile storage unit 13. Then, when returning from the standby state to the normal operating state after transition from the normal operating state to the standby state, the setting switching unit 1833 refers to the held setting information to control to the setting before transition to the standby state among the first setting, the second setting, and the third setting before transition to the standby state. Further, when returning from the shutdown state to the normal operating state after transition from the normal operating state to the shutdown state, the setting switching unit 1833 also controls to the setting before transition to the shutdown state among the first setting, the second setting, and the third setting.

The display control unit 1834 controls the display of the display 150. For example, the display control unit 1834 performs control of On/Off (displaying/hiding) of the display of the display 150, and outputs and displays display-data of the window of an app to be displayed in each display area according to the display mode set by the display mode switching unit 1832. Further, upon transition from the standby state or the shutdown state to the normal operating state, the display control unit 1834 controls, in the normal operating state, the display orientation in the screen area of the display 150 according to the orientation of the information processing device 10 (the orientation of the screen area of the display 150).

Next, the operation of display control processing executed by the control unit 18 will be described.

Figure 9:
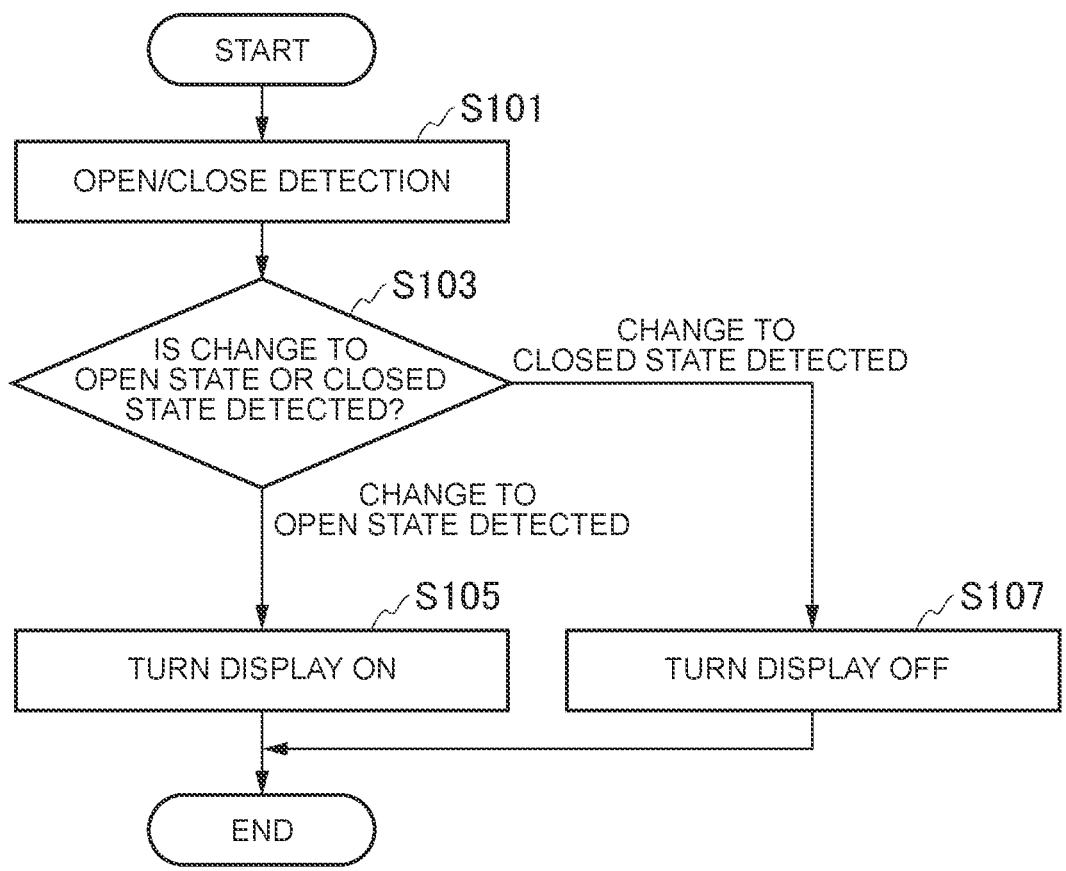
FIG. 9 is a flowchart illustrating an example of display control processing based on open/close detection according to one or more embodiments.

FIG. 9 is a flowchart illustrating an example of the display control processing based on the open/close detection according to one or more embodiments.

(Step S101) Based on the detection results of the first acceleration sensor 161 and the second acceleration sensor 162, the control unit 18 detects whether the information processing device 10 is in the open state or the closed state. Then, the control unit 18 proceeds to a process in step S103.

(Step S103) Based on the detection result in step S101, the control unit 18 determines whether a change in the information processing device 10 from the closed state to the open state or from the open state to the closed state is detected. When determining that the change from the closed state to the open state is detected, the control unit 18 proceeds to a process in step S105. On the other hand, when determining that the change from the open state to the closed state is detected, the control unit 18 proceeds to a process in step S107.

(Step S105) When determining that the change from the closed state to the open state is detected, the control unit 18 controls the display of the display 150 to be turned on.

(Step S107) When determining that the change from the open state to the closed state is detected, the control unit 18 controls the display of the display 150 to be turned off.

Note that, when controlling the display of the display 150 to be turned on in step S105 in the case of returning from the shutdown state, the control unit 18 sets the display mode to the one-screen mode by default, and sets the display mode to the display mode before transition from the normal operating state to the standby state in the case of returning from the standby state. After that, in the state where the display is controlled to be on, display mode switching processing to switch between the one-screen mode and the two-screen mode (or the inverted two-screen mode) is executed to be described below.

Next, the operation of the display mode switching processing executed by the control unit 18 will be described.

Figure 10:
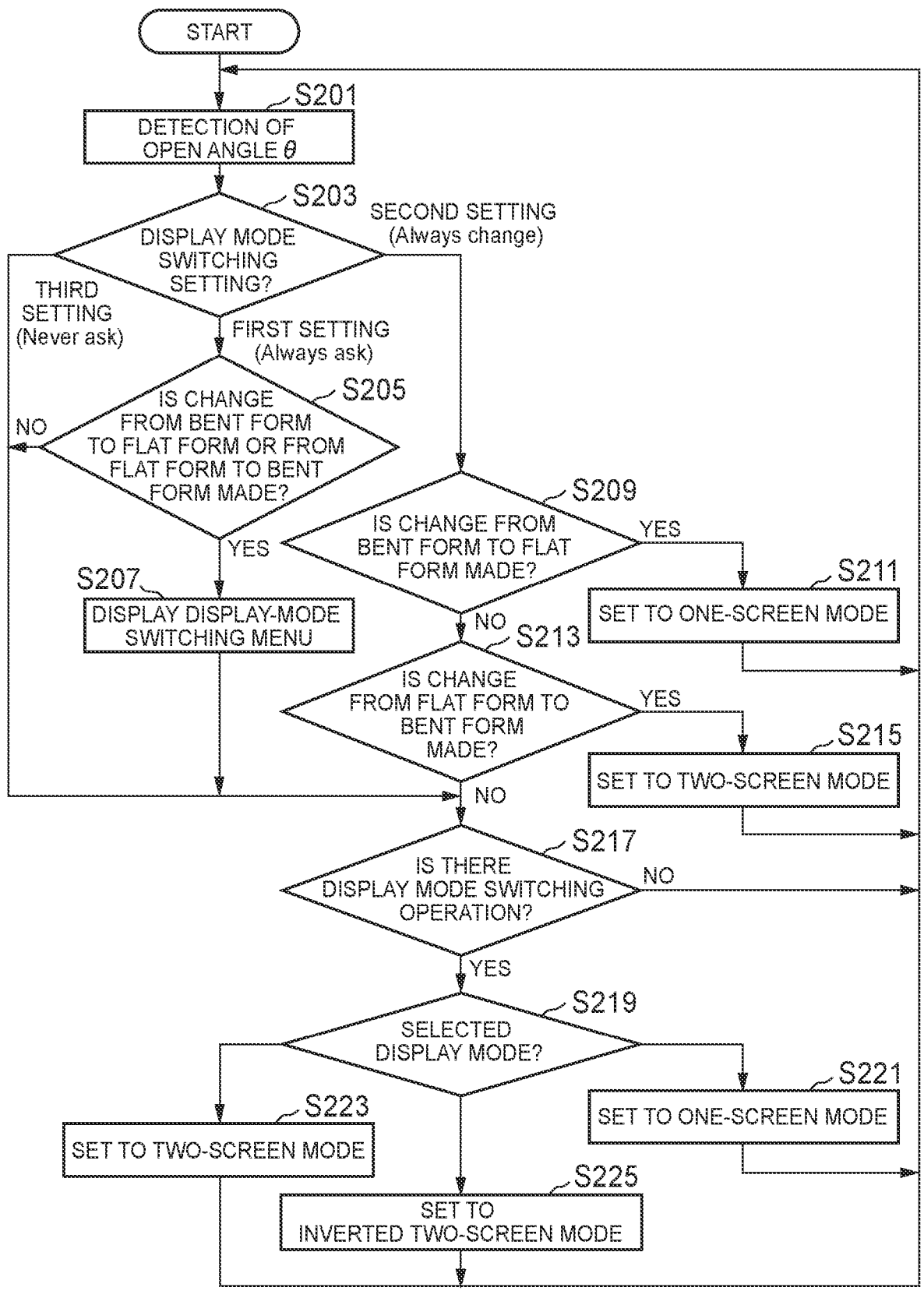
FIG. 10 is a flowchart illustrating an example of display mode switching processing according to one or more embodiments.

FIG. 10 is a flowchart illustrating an example of the display mode switching processing according to one or more embodiments. Here, the display mode switching processing will be described as processing in the normal operating state after the control unit 18 detects the change from the closed state to the open state in the display control processing based on the open/close detection illustrated in FIG. 9 to control the display to be turned on.

(Step S201) The control unit 18 detects the open angle θ between the first chassis 101 and the second chassis 102 based on the detection results of the first acceleration sensor 161 and the second acceleration sensor 162. Then, the control unit 18 proceeds to a process in step S203.

(Step S203) The control unit 18 determines the current display mode switching setting. When determining that the current display mode switching setting is the first setting (Always ask), the control unit 18 proceeds to a process in step S205. When determining that the current display mode switching setting is the second setting (Always change), the control unit 18 proceeds to a process in step S209. Further, when determining that the current display mode switching setting is the third setting (Never ask), the control unit 18 proceeds to a process in step S217.

(Step S205) In the first setting (Always ask), the control unit 18 determines, based on the open angle θ detected in step S201, whether or not there is a change from the bent state (Bent form) to the flat state (Flat form) or a change from the flat state (Flat form) to the bent state (Bent form). When determining that both the change from the bent state to the flat state and the change from the flat state to the bent state are not made (NO), the control unit 18 proceeds to the process in step S217. On the other hand, when determining that either the change from the bent state to the flat state or the change from the flat state to the bent state is made (YES), the control unit 18 proceeds to a process in step S207.

(Step S207) The control unit 18 automatically displays a display mode switching menu (for example, the switching menu M1 or the switching menu M2 illustrated in FIG. 5) on the display 150 as a pop-up screen. Then, the control unit 18 proceeds to the process in step S217.

(Step S209) Based on the open angle θ detected in step S201, the control unit 18 determines whether or not the change from the bent state (Bent form) to the flat state (Flat form) is made. When determining that the change from the bent state (Bent form) to the flat state (Flat form) is made (YES), the control unit 18 proceeds to a process in step S211. On the other hand, when determining that the change from the bent state (Bent form) to the flat state (Flat form) is not made (NO), the control unit 18 proceeds to a process in step S213.

(Step S211) When determining in step SS209 that the change from the bent state (Bent form) to the flat state (Flat form) is made, the control unit 18 sets the screen mode to the one-screen mode. For example, when the setting of the screen mode immediately before the above determination is the two-screen mode, the control unit 18 switches from the two-screen mode to the one-screen mode. On the other hand, when the setting of the screen mode immediately before the above determination is the one-screen mode, the control unit 18 continues the setting of the one-screen mode. Note that the control unit 18 controls the display mode to the display mode (d') or the display mode (e') illustrated in FIG. 4 based on the posture (orientation) of the information processing device 10 detected based on the detection results of the first acceleration sensor 161 and the second acceleration sensor 162. Then, the control unit 18 returns to the process in step S201.

(Step S213) Based on the open angle θ detected in step S201, the control unit 18 determines whether or not the change from the flat state (Flat form) to the bent state (Bent form) is made. When determining that the change from the flat state (Flat form) to the bent state (Bent form) is made (YES), the control unit 18 proceeds to a process in step S215. On the other hand, when determining that the change from the flat state (Flat form) to the bent state (Bent form) is not made (NO), the control unit 18 proceeds to the process in step S217.

(Step S215) When determining in step S213 that the change from the flat state (Flat form) to the bent state (Bent form) is made, the control unit 18 sets the screen mode to the two-screen mode. For example, when the setting of the screen mode immediately before the above determination is the two-screen mode, the control unit 18 continues the setting of the two-screen mode. On the other hand, when the setting of the screen mode immediately before the above determination is the one-screen mode, the control unit 18 switches from the one-screen mode to the two-screen mode. Note that the control unit 18 controls the display mode to the display mode (b) or the display mode (c-1) illustrated in FIG. 4 based on the posture (orientation) of the information processing device 10 detected based on the detection results of the first acceleration sensor 161 and the second acceleration sensor 162. Then, the control unit 18 returns to the process in step S201.

(Step S217) Based on the operation information output from the touch sensor 155, the control unit 18 determines whether or not there is a display mode switching operation by the user. Here, the display mode switching operation is an operation on the switching menu M1 or the switching menu M2 (see FIG. 5) displayed in step S207, for example, in the case of the first setting (Always ask). Further, in the case of the first setting (Always ask), when neither the change from the bent state to the flat state nor the change from the flat state to the bent state is made, the display mode switching operation is an operation on the switching menu M1 or the switching menu M2 displayed by the user operating the icon C1 (see FIG. 5). Further, in the case of the second setting (Always change) or the third setting (Never ask), the display mode switching operation is an operation on the switching menu M1 or the switching menu M2 displayed by the user operating the icon C1 (see FIG. 5). For example, when there is an operation to select any of the display mode switching icons displayed on the switching menu M1 or the switching menu M2 illustrated in FIG. 5, the control unit 18 determines that there is the display mode switching operation. When determining that there is the display mode switching operation (YES), the control unit 18 proceeds to a process in step S219. On the other hand, when determining that there is no display mode switching operation (NO), the control unit 18 returns to the process in step S201.

(Step S219) The control unit 18 determines a display mode of the display mode switching icon selected with the display mode switching operation by the user to control the display mode. For example, when there is an operation to select the display mode switching icon C11 or C21 (see FIG. 5) corresponding to the one-screen mode, the control unit 18 proceeds to a process in step S221. Further, when there is an operation to select the display mode switching icon C12 or C22 (see FIG. 5) corresponding to the two-screen mode, the control unit 18 proceeds to a process in step S223. Further, when there is an operation to select the display mode switching icon C13 or C23 (see FIG. 5) corresponding to the inverted two-screen mode, the control unit 18 proceeds to a process in step S225.

(Step S221) The control unit 18 sets the display mode to that of the one-screen mode. For example, when the setting of the display mode before the display mode switching operation is performed is the two-screen mode, the control unit 18 switches from the two-screen mode to the one-screen mode. On the other hand, when the setting of the display mode before the display mode switching operation is performed is the one-screen mode, the control unit 18 continues the setting of the one-screen mode. Specifically, when there is an operation to select the display mode switching icon C11, the control unit 18 controls the display mode to the display mode (d) in the case of the bent state (Bent form) or to the display mode (d') in the case of the flat state (Flat form). On the other hand, when there is an operation to select the display mode switching icon C21, the control unit 18 controls the display mode to the display mode (e) or the display mode (e'). Then, the control unit 18 returns to the process in step S201.

(Step S223) The control unit 18 sets the display mode to that of the two-screen mode. For example, when the setting of the display mode before the display mode switching operation is performed is the one-screen mode, the control unit 18 switches from the one-screen mode to the two-screen mode. Further, when the setting of the display mode before the display mode switching operation is performed is the inverted two-screen mode, the control unit 18 switches from the inverted two-screen mode to the two-screen mode. Further, when the setting of the display mode before the display mode switching operation is performed is the two-screen mode, the control unit 18 continues the setting of the two-screen mode. Specifically, when there is an operation to select the display mode switching icon C12, the control unit 18 controls the display mode to the display mode (b) in the case of the bent state (Bent form), or in the case of the flat state (Flat form), the control unit 18 controls to provide a display similar to the display mode (b) in the flat state (Flat form). Further, when there is an operation to select the display mode switching icon C22, the control unit 18 controls the display mode to the display mode (c-1) in the case of the bent state (Bent form), or in the case of the flat state (Flat form), the control unit 18 controls to provide a display similar to the display mode (c-1) in the flat state (Flat form). At this time, in both of the display mode (b) and the display mode (c-1), the first display area DA1 is the primary screen and the second display area DA2 is the secondary screen. Then, the control unit 18 returns to the process in step S201.

(Step S225) The control unit 18 sets the display mode to that of the inverted two-screen mode. For example, when the setting of the display mode before the display mode switching operation is performed is the one-screen mode, the control unit 18 switches from the one-screen mode to the inverted two-screen mode. Further, when the setting of the display mode before the display mode switching operation is performed is the two-screen mode, the control unit 18 switches from the two-screen mode to the inverted two-screen mode. Further, when the setting of the display mode before the display mode switching operation is performed is the inverted two-screen mode, the control unit 18 continues the setting of the inverted two-screen mode. Specifically, when there is an operation to select the display mode switching icon C13, the control unit 18 controls the display mode to the display mode (b) in the case of the bent state (Bent form), or in the case of the flat state (Flat form), the control unit 18 controls to provide a display similar to the display mode (b) in the flat state (Flat form). Further, when there is an operation to select the display mode switching icon C23, the control unit 18 controls the display mode to the display mode (c-1) in the case of the bent state (Bent form), or in the case of the flat state (Flat form), the control unit 18 controls to provide a display similar to the display mode (c-1) in the flat state (Flat form). At this time, in both of the display mode (b) and the display mode (c-1), the second display area DA2 is the primary screen and the first display area DA1 is the secondary screen. Then, the control unit 18 returns to the process in step S201.

Next, the operation of information holding processing to hold screen mode information and setting information upon transition from the normal operating state to the standby state or the shutdown state will be described.

Figure 11:
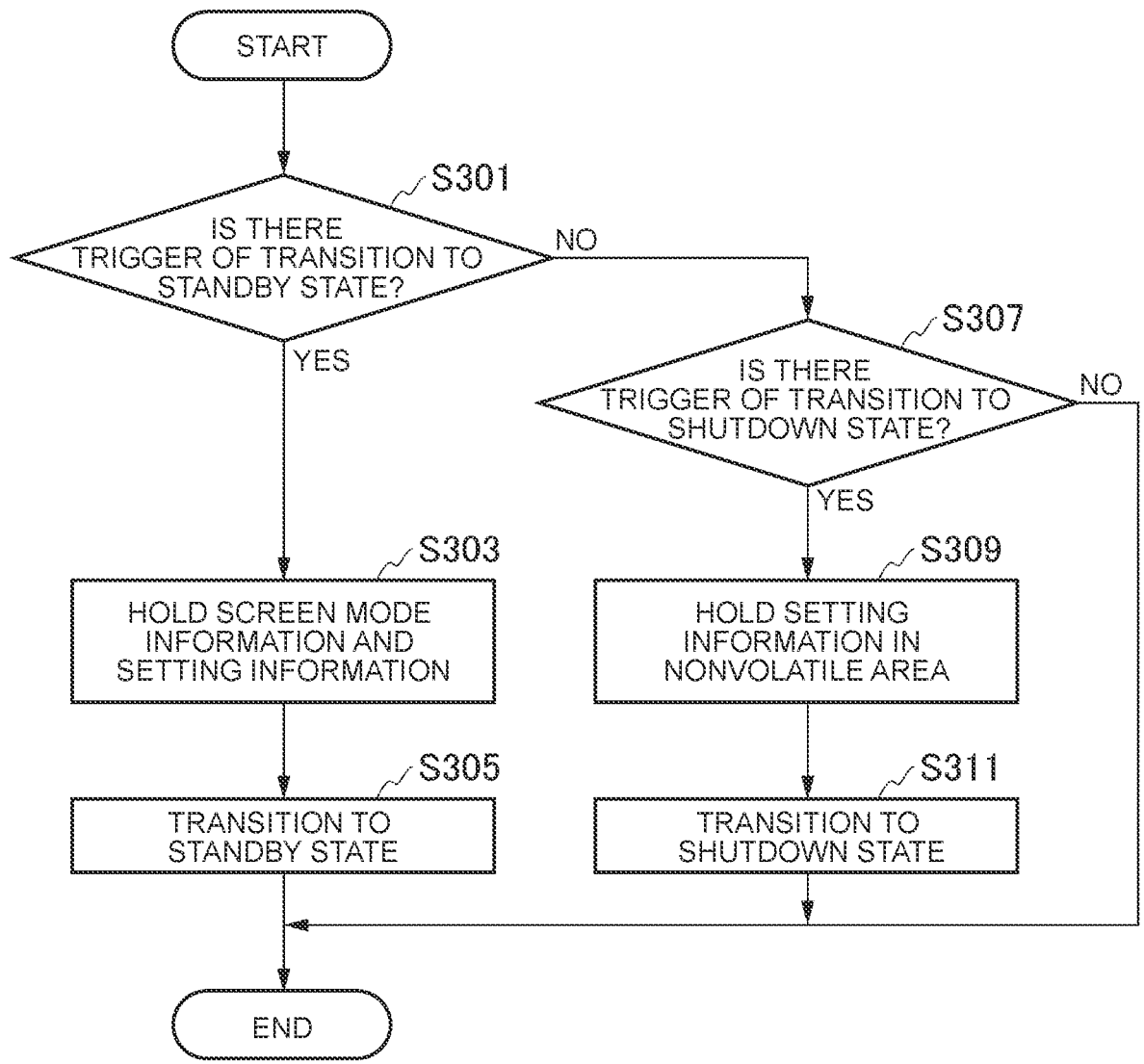
FIG. 11 is a flowchart illustrating an example of information holding processing according to one or more embodiments.

FIG. 11 is a flowchart illustrating an example of the information holding processing according to one or more embodiments.

(Step S301) The control unit 18 determines whether or not there is a trigger of transition from the normal operating state to the standby state. When determining that there is no trigger of transition from the normal operating state to the standby state (NO), the control unit 18 proceeds to a process in step S307. On the other hand, when determining that there is the trigger of transition from the normal operating state to the standby state (YES), the control unit 18 proceeds to a process in step S303.

(Step S303) The control unit 18 holds screen mode information indicative of whether the screen mode is the one-screen mode, the two-screen mode, or the inverted two-screen mode. Further, the control unit 18 holds setting information indicative of whether the display mode switching setting is set to the first setting (Always ask), the second setting (Always change), or the third setting (Never ask). For example, the control unit 18 stores and holds the setting information in the RAM 12. Then, the control unit 18 proceeds to a process in step S305.

(Step S305) The control unit 18 makes a transition from the normal operating state to the standby state.

(Step S307) The control unit 18 determines whether or not there is a trigger of transition from the normal operating state to the shutdown state. When determining that there is no trigger of transition from the normal operating state to the shutdown state (NO), the control unit 18 ends the processing. On the other hand, when determining that there is the trigger of transition from the normal operating state to the shutdown state (YES), the control unit 18 proceeds to a process in step S309.

(Step S309) The control unit 18 holds the setting information indicative of whether the display mode switching setting is set to the first setting (Always ask), the second setting (Always change), or the third setting (Never ask). For example, the control unit 18 stores and holds the setting information in the storage unit 13 (in a nonvolatile area such as the SSD, the HDD, or the Flash-ROM). Then, the control unit 18 proceeds to a process in step S311.

(Step S311) The control unit 18 makes a transition from the normal operating state to the shutdown state.

Next, the operation of display mode switching processing upon returning from the standby state or the shutdown state to the normal operating state will be described.

Figure 12:
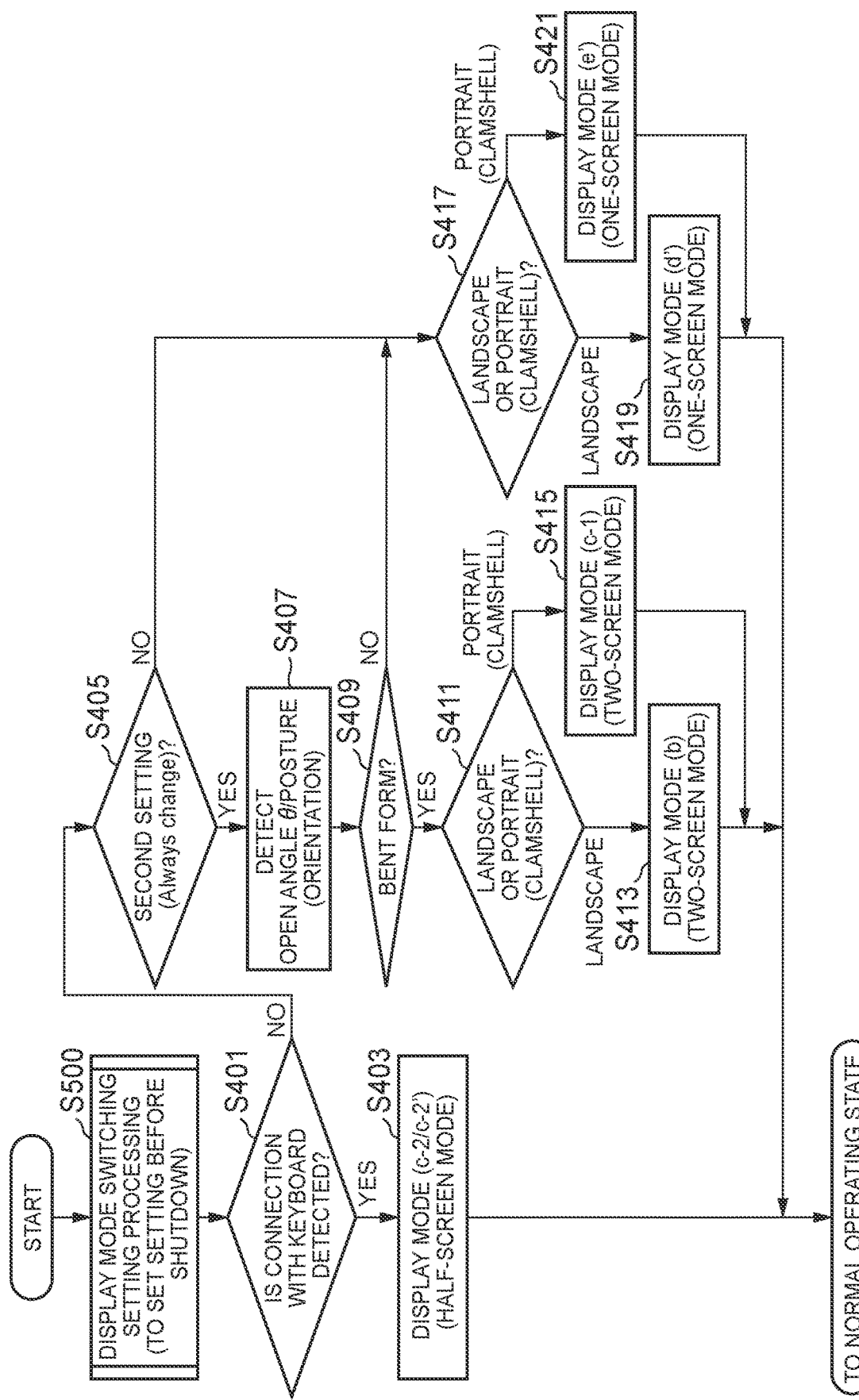
FIG. 12 is a flowchart illustrating an example of display mode switching processing upon returning from a shutdown state according to one or more embodiments.

FIG. 12 is a flowchart illustrating an example of the display mode switching processing upon returning from the shutdown state according to one or more embodiments.

(Step S500) The control unit 18 executes the display mode switching setting processing. Here, upon returning from the shutdown state to the normal operating state, the control unit 18 sets the setting before the shutdown state among the first setting (Always ask), the second setting (Always change), and the third setting (Never ask). This display mode switching setting processing will be described in detail later with reference to FIG. 14.

(Step S401) Upon returning from the shutdown state to the normal operating state, the control unit 18 detects the presence or absence of the connection with the keyboard 30 to determine whether or not the connection with the keyboard 30 is detected. When determining that the connection with the keyboard 30 is detected (YES), the control unit 18 proceeds to a process in step S403. On the other hand, when determining that the connection with the keyboard 30 is not detected (NO), the control unit 18 proceeds to a process in step S405.

(Step S403) The control unit 18 selects the half-screen mode to determine, for example, the display mode (c-2) or the display mode (c-2') illustrated in FIG. 4. Then, the control unit 18 makes a transition to the normal operating state.

(Step S405) The control unit 18 determines whether or not the display mode switching setting is the second setting (Always change). When determining that the display mode switching setting is the second setting (YES), the control unit 18 proceeds to a process in step S407. On the other hand, when determining that the display mode switching setting is not the second setting (i.e., that the display mode switching setting is the first setting or the third setting) (NO), the control unit 18 proceeds to a process in step S417.

(Step S407) Based on the detection results of the first acceleration sensor 161 and the second acceleration sensor 162, the control unit 18 detects the open angle θ between the first chassis 101 and the second chassis 102, and the posture (orientation) of the information processing device 10. Then, the control unit 18 proceeds to a process in step S409.

(Step S409) Based on the open angle θ detected in step S407, the control unit 18 determines whether or not it is the bent state (Bent form). When determining that it is the bent state (Bent form) (YES), the control unit 18 proceeds to a process in step S411. On the other hand, when determining that it is not the bent state (Bent form) (NO), the control unit 18 proceeds to the process in step S417.

(Step S411) Based on the posture (orientation) of the information processing device 10 detected in step S407, the control unit 18 determines whether the usage form of the information processing device 10 is "Landscape" or "Portrait (Clamshell)." When determining that the usage form of the information processing device 10 is "Landscape," the control unit 18 proceeds to a process in step S413. On the other hand, when determining that the usage form of the information processing device 10 is "Portrait (Clamshell)," the control unit 18 proceeds to a process in step S415.

(Step S413) The control unit 18 selects the two-screen mode and determines the display mode, for example, as the display mode (b) illustrated in FIG. 4. Then, the control unit 18 makes the transition to the normal operating state.

(Step S415) The control unit 18 selects the two-screen mode and determines the display mode, for example, as the display mode (c-1) illustrated in FIG. 4. Then, the control unit 18 makes the transition to the normal operating state.

(Step S417) Like in step S411, the control unit 18 determines whether the usage form of the information processing device 10 is "Landscape" or "Portrait (Clamshell)" based on the posture (orientation) of the information processing device 10 detected in step S407.

When determining that the usage form of the information processing device 10 is "Landscape," the control unit 18 proceeds to a process in step S419. On the other hand, when determining that the usage of the information processing device 10 is "Portrait (Clamshell)," the control unit 18 proceeds to a process in step S421.

(Step S419) The control unit 18 selects the one-screen mode and determines, for example, the display mode (d') illustrated in FIG. 4. Then, the control unit 18 makes the transition to the normal operating state.

(Step S421) The control unit 18 selects the one-screen mode and determines, for example, the display mode (e') illustrated in FIG. 4. Then, the control unit 18 makes the transition to the normal operating state.

Figure 13:
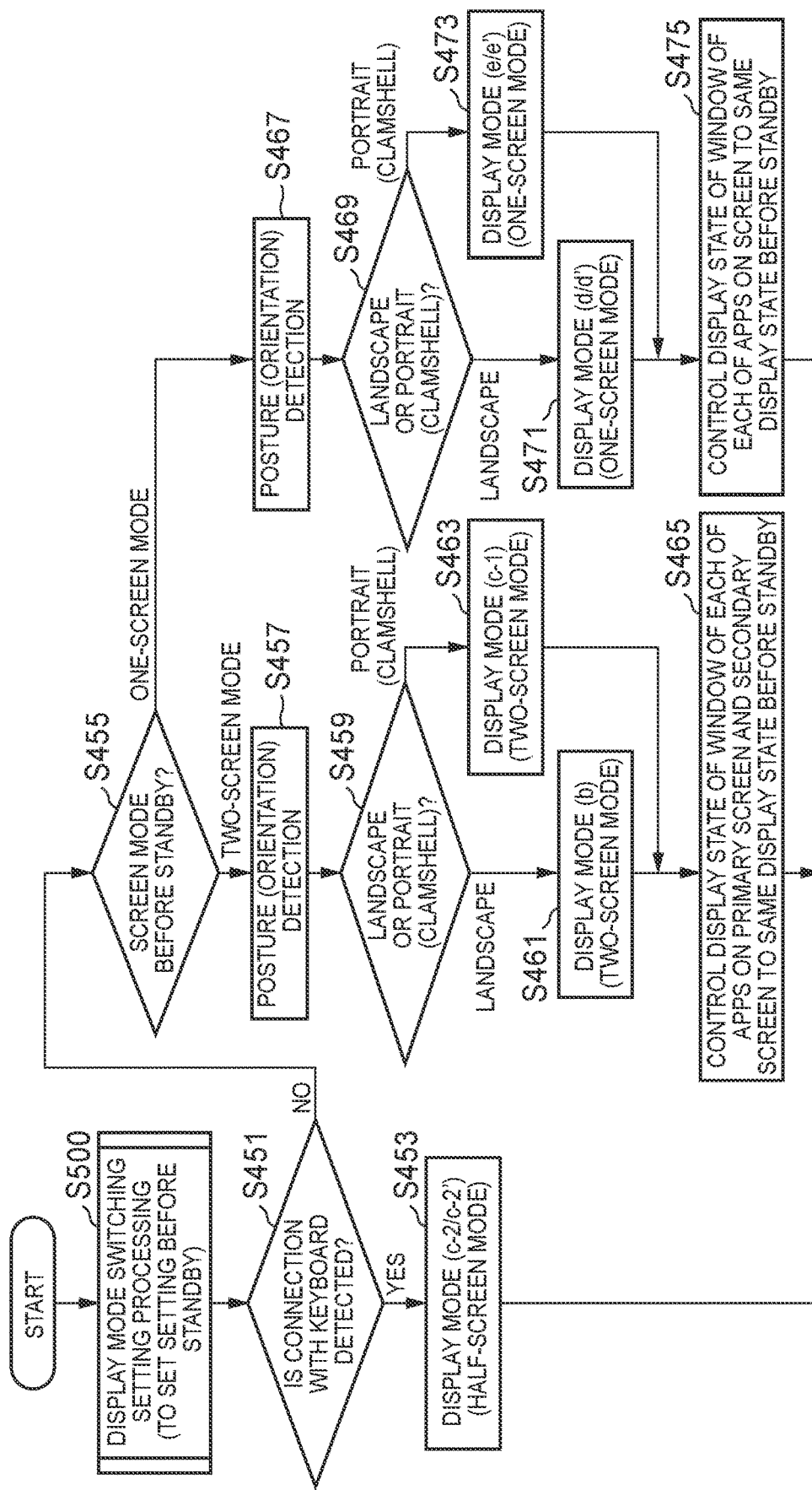
FIG. 13 is a flowchart illustrating an example of display mode switching processing upon returning from a standby state according to one or more embodiments.

FIG. 13 is a flowchart illustrating an example of display mode switching processing upon returning from the standby state according to one or more embodiments.

(Step S500) The control unit 18 executes the display mode switching setting processing. Here, upon returning from the standby state to the normal operating state, the control unit 18 sets the setting before the standby state among the first setting (Always ask), the second setting (Always change), and the third setting (Never ask). This display mode switching setting processing will be described in detail later with reference to FIG. 14.

(Step S451) The control unit 18 detects the presence or absence of the connection with the keyboard 30 upon returning from the standby state to the normal operating state to determine whether or not the connection with the keyboard 30 is detected. When determining that the connection with the keyboard 30 is detected (YES), the control unit 18 proceeds to a process in step S453. On the other hand, when determining that the connection with the keyboard 30 is not detected (NO), the control unit 18 proceeds to a process in step S455.

(Step S453) The control unit 18 selects the half-screen mode to determine, for example, the display mode (c-2) or the display mode (c-2') illustrated in FIG. 4. Then, the control unit 18 makes the transition to the normal operating state.

(Step S455) The control unit 18 refers to the held screen mode information to determine the screen mode before the transition to the standby state between the one-screen mode and the two-screen mode (or the inverted two-screen mode). When the screen mode before the transition to the standby state is the one-screen mode, the control unit 18 proceeds to a process in step S467, while when the screen mode is the two-screen mode (or the inverted two-screen mode), the control unit 18 proceeds to a process in step S457.

(Step S457) Based on the detection results of the first acceleration sensor 161 and the second acceleration sensor 162, the control unit 18 detects the posture (orientation) of the information processing device 10. Then, the control unit 18 proceeds to a process in step S459.

(Step S459) Based on the posture (orientation) of the information processing device 10 detected in step S457, the control unit 18 determines whether the usage form of the information processing device 10 is "Landscape" or "Portrait (Clamshell)." When determining that the usage form of the information processing device 10 is "Landscape," the control unit 18 proceeds to a process in step S461. On the other hand, when determining that the usage of the information processing device 10 is "Portrait (Clamshell)," the control unit 18 proceeds to a process in step S463.

(Step S461) The control unit 18 selects the two-screen mode (or the inverted two-screen mode) to determine, for example, the display mode (b) illustrated in FIG. 4. Then, the control unit 18 proceeds to a process in step S465.

(Step S463) The control unit 18 selects the two-screen mode (or the inverted two-screen mode) to determine, for example, the display mode (c-1) illustrated in FIG. 4. Then, the control unit 18 proceeds to the process step S465.

(Step S465) The control unit 18 controls (restores) the display state of the window of each of apps on the primary screen and the secondary screen to the same display state before transition to the standby state. The display state includes the position of the window of each app (the display position on the screen), the size of the window, the order of windows of apps (the stacking order of windows when the active window is in the foreground), and the like. For example, upon transition to the standby state, the control unit 18 stores and holds, in the RAM 12, information about the display state of the windows of apps displayed respectively on the primary screen and the secondary screen, and upon returning from the standby state, the control unit 18 refers to the information about this display state to control the display state of the windows of apps to the same display state before transition to the standby state. Then, the control unit 18 makes the transition to the normal operating state.

(Step S467) Like in step S457, the control unit 18 detects the posture (orientation) of the information processing device 10 based on the detection results of the first acceleration sensor 161 and the second acceleration sensor 162. Then, the control unit 18 proceeds to a process in step S469.

(Step S469) Based on the posture (orientation) of the information processing device 10 detected in step S467, the control unit 18 determines whether the usage form of the information processing device 10 is "Landscape" or "Portrait (Clamshell)." When determining that the usage form of the information processing device 10 is "Landscape," the control unit 18 proceeds to a process in step S471. On the other hand, when determining that the usage of the information processing device 10 is "Portrait (Clamshell)," the control unit 18 proceeds to a process in step S473.

(Step S471) The control unit 18 selects the one-screen mode to determine, for example, the display mode (d) or the display mode (d') illustrated in FIG. 4. Then, the control unit 18 proceeds to a process in step S475.

(Step S473) The control unit 18 selects the one-screen mode to determine, for example, the display mode (e) or the display mode (e') illustrated in FIG. 4. Then, the control unit 18 proceeds to the process in step S475.

(Step S475) The control unit 18 controls (restores) the display state of the window of each of apps on the screen (display area DA) to the same display state before transition to the standby state. The display state includes the position of the window of each app (the display position on the screen), the size of the window, the order of windows of apps (the stacking order of windows when the active window is in the foreground), and the like. Note that the function to control (restore) the display state to the same display state before transition to the standby state may also be realized, for example, by using the OS function. Then, the control unit 18 makes the transition to the normal operating state.

Figure 14:
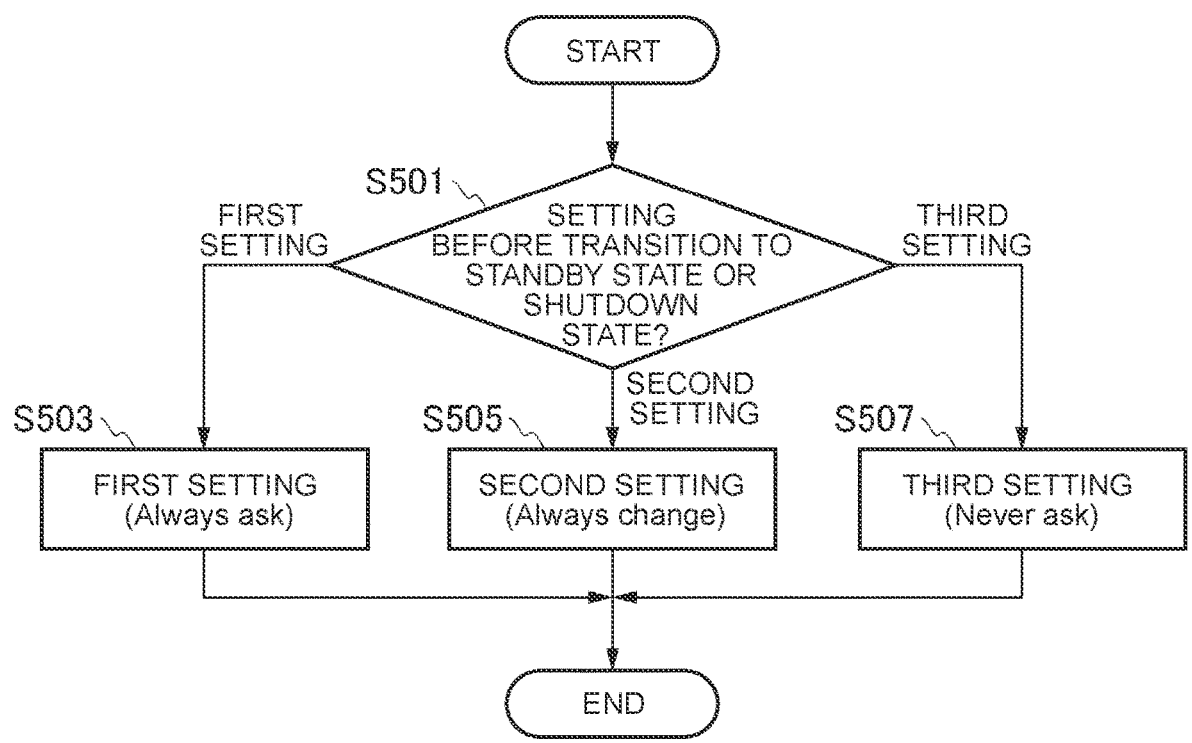
FIG. 14 is a flowchart illustrating an example of the display mode switching setting processing upon returning according to one or more embodiments.

Referring next to FIG. 14, the operation of the display mode switching setting processing (the display mode switching setting processing when returning from the standby state or the shutdown state to the normal operating state) in step S500 of FIG. 12 and FIG. 13 described above will be described.

FIG. 14 is a flowchart illustrating an example of the display mode switching setting processing upon returning according to one or more embodiments.

(Step S501) Upon returning from the standby state or the shutdown state to the normal operating state, the control unit 18 refers to the held setting information to determine the display mode switching setting before transition to the standby state or the shutdown state. When the display mode switching setting before transition to the standby state or the shutdown state is the first setting, the control unit 18 controls the display mode switching setting to the first setting (Always ask) (step S503). Further, when the display mode switching setting before transition to the standby state or the shutdown state is the second setting, the control unit 18 controls display mode switching setting to the second setting (Always change) (step S505). Further, when the display mode switching setting before transition to the standby state or the shutdown state is the third setting, the control unit 18 controls the display mode switching setting to the third setting (Never ask) (step S507).

As described above, the information processing device 10 according to one or more embodiments includes the foldable one display 150, the storage unit 13 (an example of a memory) which stores at least a program, and the control unit 18 (an example of a processor such as a CPU, a GPU, or a microcomputer) which executes the program stored in the storage unit 13. The control unit 18 executes the program stored in the storage unit 13 to perform each of the following processing steps. The control unit 18 performs operating state switching processing to switch the operating state of the OS (an example of a system) among the normal operating state (an example of a first operating state), the standby state (an example of a second operating state) in which the processing of the OS is more limited than that in the normal operating state and at least the display 150 is hidden, and the shutdown state (an example of a third operating state) in which the processing of the OS is shut down. Further, the control unit 18 performs display mode switching processing to switch between the one-screen mode (an example of a first display mode) to control display by setting the screen area of the display 150 as the one display area DA, and the two-screen mode (an example of a second display mode) to control display by splitting the screen area into plural display areas (for example, two display areas). Further, the control unit 18 performs setting switching processing to switch among the first setting to provide a control to allow the user to select either one of the one-screen mode and the two-screen mode according to a change in the state as to whether or not the display 150 is in the bent state, the second setting to perform the above display mode switching processing according to the change in the state as to whether or not the display 150 is in the bent state, and the third setting in which the above display mode switching processing is not performed even when there is the change in the state as to whether or not the display 150 is in the bent state. Then, when returning from the standby state to the normal operating state after transition from the normal operating state to the standby state, the control unit 18 controls the screen mode to that before transition to the standby state between the one-screen mode and the two-screen mode by the above display mode switching processing, and controls the setting to that before transition to the standby state among the first setting (Always ask), the second setting (Always change), and the third setting (Never ask) by the above setting switching processing.

Thus, when work is temporarily interrupted in the middle of working in the one-screen mode or the two-screen mode and then the work is resumed, since the user can resume the work in the screen mode before interruption and the screen mode switching setting when the state of the display 150 is changed to the bent state or the flat state is also that before interruption, the information processing device 10 is convenient for the user. Therefore, the information processing device 10 can control switching between the one-screen mode and the two-screen mode properly, that is, the information processing device 10 can control the display on the foldable display 150 properly.

Note that the two-screen mode mentioned above is a screen mode (display mode) to control display by splitting the screen area of the display 150 into two display areas of the first display area DA1 and the second display area DA2. By the display mode switching processing mentioned above, the control unit 18 performs control by distinguishing between two kinds of two-screen modes when display is controlled by setting the first display area DA1 as the primary screen and the second display area DA2 as the secondary screen, and when display is controlled by setting the second display area DA2 as the primary screen and the first display area DA1 as the secondary screen.

Thus, when work is temporarily interrupted in the middle of working in the one-screen mode or the two-screen mode and then the work is resumed, since the user can resume the work in the screen mode before interruption and the setting of the primary screen and the secondary screen in the case of the two-screen mode follows the setting before interruption, the information processing device 10 is convenient for the user. Therefore, the information processing device 10 can control switching between the one-screen mode and the two-screen mode properly.

Further, when returning from the shutdown state to the normal operating state after transition from the normal operating state or the standby state to the shutdown state, the control unit 18 controls the screen mode to a preset screen mode (for example, the one-screen mode) between the one-screen mode and the two-screen mode by the display mode switching processing mentioned above, and controls the setting to a setting before transition to the shutdown state among the first setting (Always ask), the second setting (Always change), and the third setting (Never ask) by the setting switching processing mentioned above.

Thus, when starting new work after finishing work done in the one-screen mode or the two-screen mode and shutting down the information processing device 10, the user can start working in a default screen mode (for example, the one-screen mode) without following the screen mode before interruption. On the other hand, since the screen mode switching setting when the display 150 is put into the bent state or the flat state follows that before interruption, the user can do the work in the way of using the information processing device 10 to suit the user's taste. Therefore, the information processing device 10 can control switching between the one-screen mode and the two-screen mode properly.

Further, the information processing device 10 includes the first acceleration sensor 161 and the second acceleration sensor 162 (an example of a first sensor) to detect the orientation of the information processing device 10. The control unit 18 performs orientation detection processing to detect the orientation of the screen area of the display 150 based on the detection results of the first acceleration sensor 161 and the second acceleration sensor 162, and display control processing to change the display orientation in the screen area according to a change in the orientation of the screen area detected by the above orientation detection processing. Then, when returning from the standby state or the shutdown state to the normal operating state, the control unit 18 controls, by the above display control processing, the display orientation in the screen area according to the change in the orientation of the screen area upon returning.

Thus, when returning from the standby state or the shutdown state to the normal operating state, since the information processing device 10 controls the display orientation in the screen area according to the orientation of the screen area of the display 150 upon returning to the normal operating state, the information processing device 10 can control the display properly even when the display is provided in both the one-screen mode and the two-screen mode.

Further, the control unit 18 performs connection detection processing to detect the connection with the external keyboard 30. Then, when returning from the standby state or the shutdown state to the normal operating state, the control unit 18 detects the presence or absence of the connection with the keyboard 30 by the above connection detection processing, and when the connection with the keyboard 30 is detected in the two-screen mode, the control unit 18 switches, by the above display mode switching processing, to the half-screen mode (an example of a third display mode) in which only the first display area DA1 is the display target.

Thus, when the external keyboard 30 is connected, since the information processing device 10 is always booted in the half-screen mode, it is convenient for the user.

Further, the information processing device 10 includes the first acceleration sensor 161 and the second acceleration sensor 162 (an example of a second sensor) to detect the first chassis 101 and the second chassis 102 connected to be rotatable relative to each other, and the relative rotation state of the first chassis 101 and the second chassis 102. The display 150 is provided over the first chassis 101 and the second chassis 102 in such a manner that the display 150 is foldable (bendable) according to the rotation of the first chassis 101 and the second chassis 102. The control unit 18 performs detection processing to detect whether the display is in the bent state or not based on the detection results of the first acceleration sensor 161 and the second acceleration sensor 162.

Thus, the information processing device 10 can automatically detect whether the display 150 is in the bent state or not, and can properly control switching between the one-screen mode and the two-screen mode based on whether the display 150 is in the bent state or not.

Further, a control method for the information processing device 10 according to one or more embodiments includes: a step of causing the control unit 18 (the example of the processor such as the CPU, the GPU, or the microcomputer) to execute the program stored in the storage unit 13 (the example of the memory) to switch the operating state of the OS (the example of the system) among the normal operating state (the example of the first operating state), the standby state (the example of the second operating state) in which the processing of the OS is more limited than that in the normal operating state and at least the display 150 is hidden, and the shutdown state (the example of the third operating state) in which the processing of the OS is shut down; a step of switching between the one-screen mode (the example of the first display mode) to control display by setting the screen area of the display 150 as the one display area DA, and the two-screen mode (the example of the second display mode) to control display by splitting the screen area into plural display areas (for example, two display areas); a step of switching among the first setting to provide a control to allow the user to select either one of the one-screen mode and the two-screen mode according to a change in the state as to whether or not the display 150 is in the bent state, the second setting to perform the above display mode switching processing according to the change in the state as to whether or not the display 150 is in the bent state, and the third setting in which the above display mode switching processing is not performed even when there is the change in the state as to whether or not the display 150 is in the bent state; and a step in which, when returning from the standby state to the normal operating state after transition from the normal operating state to the standby state, the screen mode is controlled to that before transition to the standby state between the one-screen mode and the two-screen mode, and the setting is controlled to that before transition to the standby state among the first setting (Always ask), the second setting (Always change), and the third setting (Never ask).

Thus, when work is temporarily interrupted in the middle of working in the one-screen mode or the two-screen mode and then the work is resumed, since the user can resume the work in the screen mode before interruption, and the display mode switching setting when the display 150 is put into the bent state or the flat state is also set to the setting before interruption, the information processing device 10 is convenient for the user. Therefore, the information processing device 10 can control switching between the one-screen mode and the two-screen mode properly, that is, the information processing device 10 can control display on the foldable display 150 properly.

While the embodiments of this invention have been described in detail with reference to the accompanying drawings, the specific configuration is not limited to that described above, and various design changes and the like can be made without departing from the scope of this invention.

Further, in the above-described embodiments, the example in which the first display area DA1 is set to the primary screen and the second display area DA2 is set to the secondary screen by default in the two-screen mode, and the second display area DA2 is set to the primary screen and the first display area DA1 is set to the secondary screen in the inverted two-screen mode is described, but the correspondence between the primary screen and the secondary screen may be reversed. In other words, the correspondence may also be such that the second display area DA2 is set to the primary screen and the first display area DA1 is set to the secondary screen by default in the two-screen mode, and the first display area DA1 is set to the primary screen and the second display area DA2 is set to the secondary screen in the inverted two-screen mode.

Further, in the above-described embodiments, the examples of the one-screen mode, in which the screen area of the display 150 is controlled as the one display area DA to control display, and the two-screen mode, in which the screen area of the display 150 is split into two display areas of the first display area DA1 and the second display area DA2 to control respective displays, are described. However, when the screen area of the display 150 is split, it is not limited to splitting the screen area into only two display areas, and it may be split into three or more display areas. For example, even in a case of a three-screen mode in which the screen area of the display 150 is split into three display areas to control respective displays, the display orientation of each of the three display areas may also be changed according to the rotation of the display 150 without replacing pieces of display data to be displayed respectively in the three display areas.

Further, in the above-described embodiments, the example of using the foldable one display 150 in the one-screen mode and the two-screen mode is described, but two displays may also be used. In other words, the processing in the embodiments described above can also be applied to switching between the one-screen mode to control display as a screen area (display area) obtained by combining respective screen areas (display areas) of the two displays into one, and the two-screen mode to control displays in the respective screen areas (display areas) of the two displays individually.

Further, in the above-described embodiments, the example of touch operations on one or more touch panel displays, each of which is composed integrally of an input unit (touch sensor) and a display unit, is described, but the operations are not limited to the touch operations, and the operations may also be click operations using a mouse, operations by gestures, and the like.

Note that the above-described control unit 18 has a computer system therein. Then, a program for implementing the function of each component included in the control unit 18 described above may be recorded on a computer-readable recording medium in such a manner that the program recorded on this recording medium is read into the computer system and executed to perform processing in each component included in the control unit 18 described above. Here, the fact that "the program recorded on the recording medium is read into the computer system and executed" includes installing the program on the computer system. It is assumed that the "computer system" here includes the OS and hardware such as a peripheral device and the like. Further, the "computer system" may also include two or more computers connected through any of networks including the Internet, WAN, LAN, and a communication line such as a dedicated line. Further, the "computer-readable recording medium" means a storage medium such as a flexible disk, a magneto-optical disk, a ROM, a portable medium like a CD-ROM, or a hard disk incorporated in the computer system. The recording medium with the program stored thereon may be a non-transitory recording medium such as the CD-ROM.

A recording medium internally or externally provided to be accessible from a delivery server for delivering the program is included as the recording medium. Note that the program may be divided into plural pieces, downloaded at different timings, respectively, and then united in each component included in the control unit 18, or delivery servers for delivering respective divided pieces of the program may be different from one another. Further, the "computer-readable recording medium" includes a medium on which the program is held for a given length of time, such as a volatile memory (RAM) inside a computer system as a server or a client when the program is transmitted through the network. The above-mentioned program may also be to implement some of the functions described above. Further, the program may be a so-called differential file (differential program) capable of implementing the above-described functions in combination with a program(s) already recorded in the computer system.

Further, some or all of the functions of the control unit 18 in the above-described embodiments may be realized as an integrated circuit such as LSI (Large Scale Integration). Each function may be a processor implemented individually, or part or whole thereof may be integrated as a processor. Further, the method of circuit integration is not limited to LSI, and it may be realized by a dedicated circuit or a general-purpose processor. Further, if integrated circuit technology replacing the LSI appears with the progress of semiconductor technology, an integrated circuit according to the technology may be used.

DESCRIPTION OF SYMBOLS

10 information processing device
101 first chassis 102 second chassis
103 hinge mechanism
11 communication unit
12 RAM
13 storage unit
14 speaker
15 display unit
16 camera
150 display
155 touch sensor
161 first acceleration sensor
162 second acceleration sensor
17 Hall sensor
18 control unit
181 system processing unit
1811 running app information generating unit
182 detection processing unit
1821 open/close detection unit
1822 posture detection unit
1823 connection detection unit
1824 operation detection unit
183 display processing unit
1831 display mode determination unit
1832 display mode switching unit
1833 setting switching unit
1834 display control unit

What is claimed is:

1. An information processing device comprising:
a foldable one display;
a memory which stores at least a program; and
a processor which executes the program stored in the memory,
wherein, by executing the program stored in the memory, the processor performs
operating state switching processing to switch an operating state of a system among a first operating state, a second operating state in which processing of the system is more limited than that in the first operating state and at least the display is hidden, and a third operating state in which the processing of the system is shut down,
display mode switching processing to switch between a first display mode to control display by setting a screen area of the display as one display area, and a second display mode to control display by splitting the screen area into plural display areas, and
setting switching processing to switch among a first setting to provide a control to allow a user to select either one of the first display mode and the second display mode according to a change in state as to whether or not the display is in a bent state, a second setting to perform the display mode switching processing according to the change in the state as to whether or not the display is in the bent state, and a third setting in which the display mode switching processing is not performed even when there is the change in the state as to whether or not the display is in the bent state, and
when returning from the second operating state to the first operating state after transition from the first operating state to the second operating state, the processor controls a display mode to the display mode before transition to the second operating state between the first display mode and the second display mode by the display mode switching processing, and controls a setting to the setting before transition to the second operating state among the first setting, the second setting, and the third setting by the setting switching processing.

2. The information processing device according to claim 1, wherein
when returning from the third operating state to the first operating state after transition from the first operating state or the second operating state to the third operating state, the processor controls the display mode to a preset display mode between the first display mode and the second display mode by the display mode switching processing, and controls the setting to a setting before transition to the third operating state among the first setting, the second setting, and the third setting by the setting switching processing.

3. The information processing device according to claim 2, further comprising
a first sensor which detects orientation of the information processing device,
wherein, by executing the program stored in the memory, the processor further performs
orientation detection processing to detect orientation of the screen area based on a detection result of the first sensor, and
display control processing to change display orientation in the screen area according to a change in the orientation of the screen area detected by the orientation detection processing, and
when returning from the second operating state or the third operating state to the first operating state, the processor controls, by the display control processing, the display orientation in the screen area according to the orientation of the screen area upon returning.

4. The information processing device according to claim 2, wherein
by executing the program stored in the memory, the processor further performs connection detection processing to detect connection with an external keyboard, and
when returning from the second operating state or the third operating state to the first operating state, the processor detects presence or absence of the connection with the keyboard by the connection detection processing, and when the connection with the keyboard is detected, the processor switches to a third display mode by the display mode switching processing to provide a display only in a first display area when the screen area of the display is split into two display areas of the first display area and a second display area.

5. The information processing device according to claim 1, wherein
the second display mode is a display mode to control display by splitting the screen area of the display into two display areas of a first display area and a second display area, and
by the display mode switching processing, the processor performs control by distinguishing between two kinds of second display modes when display is controlled by setting the first display area as a primary screen and the second display area as a secondary screen, and when display is controlled by setting the second display area as the primary screen and the first display area as the secondary screen.

6. The information processing device according to claim 1, further comprising:
a first chassis and a second chassis connected to be rotatable relative to each other; and a second sensor which detects a relative rotation state of the first chassis and the second chassis, wherein the display is provided over the first chassis and the second chassis in such a manner that the display is foldable according to the rotation of the first chassis and the second chassis, and by executing the program stored in the memory, the processor further performs detection processing to detect whether or not the display is in the bent state based on the detection result of the second sensor.

7. An information processing device comprising:

a foldable one display;

a memory which stores at least a program; and a processor which executes the program stored in the memory, wherein, by executing the program stored in the memory, the processor performs operating state switching processing to switch an operating state of a system among a first operating state, a second operating state in which processing of the system is more limited than that in the first operating state and at least the display is hidden, and a third operating state in which the processing of the system is shut down, display mode switching processing to switch between a first display mode to control display by setting a screen area of the display as one display area, and a second display mode to control display by splitting the screen area into plural display areas, and setting switching processing to switch among a first setting to provide a control to allow a user to select either one of the first display mode and the second display mode according to a change in state as to whether or not the display is in a bent state, a second setting to perform the display mode switching processing according to the change in the state as to whether or not the display is in the bent state, and a third setting in which the display mode switching processing is not performed even when there is the change in the state as to whether or not the display is in the bent state, and when returning from the second operating state to the first operating state after transition from the first operating state to the second operating state, the processor controls a display mode to the display mode before transition to the second operating state between the first display mode and the second display mode by the display mode switching processing, and when returning from the third operating state to the first operating state after transition from the first operating state or the second operating state to the third operating state, the processor controls the display mode to a preset display mode between the first display mode and the second display mode by the display mode switching processing.

8. A control method for an information processing device including: a foldable one display;

a memory which stores at least a program; and a processor which executes the program stored in the memory, the control method comprising, by the processor executing the program stored in the memory:

switching an operating state of a system among a first operating state, a second operating state in which processing of the system is more limited than that in the first operating state and at least the display is hidden, and a third operating state in which the processing of the system is shut down;

switching between a first display mode to control display by setting a screen area of the display as one display area, and a second display mode to control display by splitting the screen area into plural display areas;

switching among a first setting to provide a control to allow a user to select either one of the first display mode and the second display mode according to a change in state as to whether or not the display is in a bent state, a second setting to switch between the first display mode and the second display mode according to the change in the state as to whether or not the display is in the bent state, and a third setting in which switching between the first display mode and the second display mode is not performed even when there is the change in the state as to whether or not the display is in the bent state; and when returning from the second operating state to the first operating state after transition from the first operating state to the second operating state, a display mode is controlled to the display mode before transition to the second operating state between the first display mode and the second display mode, and a setting is controlled to the setting before transition to the second operating state among the first setting, the second setting, and the third setting.

9. A control method for an information processing device including: a foldable one display;

a memory which stores at least a program; and a processor which executes the program stored in the memory, the control method comprising, by the processor executing the program stored in the memory:

switching an operating state of a system among a first operating state, a second operating state in which processing of the system is more limited than that in the first operating state and at least the display is hidden, and a third operating state in which the processing of the system is shut down;

switching between a first display mode to control display by setting a screen area of the display as one display area, and a second display mode to control display by splitting the screen area into plural display areas;

switching among a first setting to provide a control to allow a user to select either one of the first display mode and the second display mode according to a change in state as to whether or not the display is in a bent state, a second setting to switch between the first display mode and the second display mode according to the change in the state as to whether or not the display is in the bent state, and a third setting in which switching between the first display mode and the second display mode is not performed even when there is the change in the state as to whether or not the display is in the bent state;

when returning from the second operating state to the first operating state after transition from the first operating state to the second operating state, a display mode is controlled to the display mode before transition to the second operating state between the first display mode and the second display mode; and when returning from the third operating state to the first operating state after transition from the first operating state or the second operating state to the third operating state, the display mode is controlled to a preset display mode between the first display mode and the second display mode.

\* \* \* \* \*